United States Patent [19]

Pacella

[11] Patent Number: 5,454,037
[45] Date of Patent: Sep. 26, 1995

[54] PORTABLE SECURE-TELEPHONE COMMUNICATIONS MODULE

[75] Inventor: Angelo M. Pacella, Annandale, Va.

[73] Assignee: Grayline International Limited, Annandale, Va.

[21] Appl. No.: 144,250

[22] Filed: Oct. 28, 1993

[51] Int. Cl.[6] ............................................. H04M 1/00
[52] U.S. Cl. .................................... 379/453; 379/451
[58] Field of Search ..................... 379/453, 451, 379/437, 440, 446; 244/2; 52/27.5, 27, 108, 110, 29, 36, 63, 83, 79.4, 79.5; 135/95, 106, 103; 380/52; 381/94, 73.1; 455/128, 66, 300; 312/1, 3, 5, 6, 223.4

[56] References Cited

U.S. PATENT DOCUMENTS

| | | |
|---|---|---|
| 268,240 | 11/1882 | Jones . |
| 1,642,295 | 9/1927 | Bracamonte . |
| 1,912,425 | 6/1933 | Baumer . |
| 1,929,776 | 10/1933 | Faber . |
| 1,966,288 | 7/1934 | Foltz . |
| 2,581,251 | 1/1952 | Glazer et al. . |
| 2,642,162 | 6/1953 | Tobias . |
| 2,716,782 | 9/1955 | Paulsen . |
| 2,781,766 | 2/1957 | Krieger . |
| 2,960,664 | 11/1960 | Brodwin . |
| 3,021,523 | 2/1962 | Davis et al. . |
| 3,144,513 | 8/1964 | Sherron . |
| 3,257,659 | 6/1966 | Siegel . |
| 3,350,497 | 10/1967 | Weaver, Jr. et al. . |
| 3,435,570 | 4/1969 | Berry . |
| 3,531,899 | 10/1970 | Bartlett . |
| 3,550,008 | 12/1970 | Bright . |
| 3,694,974 | 10/1972 | Eckel . |
| 3,879,578 | 4/1975 | Wildi . |
| 3,959,607 | 5/1976 | Vargo . |
| 3,963,883 | 6/1976 | Kulka . |
| 4,196,393 | 4/1980 | Schweitzer . |
| 4,252,136 | 2/1981 | Kruczynski . |
| 4,438,526 | 3/1984 | Thomalla . |
| 4,476,572 | 10/1984 | Horrall et al. . |
| 4,579,297 | 4/1986 | Ayoola ........................... 244/2 |
| 4,630,627 | 12/1986 | Windows et al. . |
| 4,677,677 | 6/1987 | Eriksson . |
| 4,682,448 | 7/1987 | Healey . |
| 4,686,693 | 8/1987 | Ritter . |
| 4,689,820 | 8/1987 | Salikuddin et al. ............ 381/94 |
| 4,733,507 | 3/1988 | Doublet . |
| 4,805,231 | 2/1989 | Whidden . |
| 4,934,396 | 6/1990 | Vitta . |

Primary Examiner—James L. Dwyer
Assistant Examiner—Jack Chiang
Attorney, Agent, or Firm—Joseph S. Iandiorio; Kirk Teska

[57] ABSTRACT

A portable secure-telephone communications module including a collapsible enclosure for holding a person desiring to perform secure remote telephone communications, a secure telephone remote communication device in the enclosure, and RF shielding for the enclosure to inhibit RF leakage for preventing eavesdropping from outside the enclosure.

39 Claims, 22 Drawing Sheets

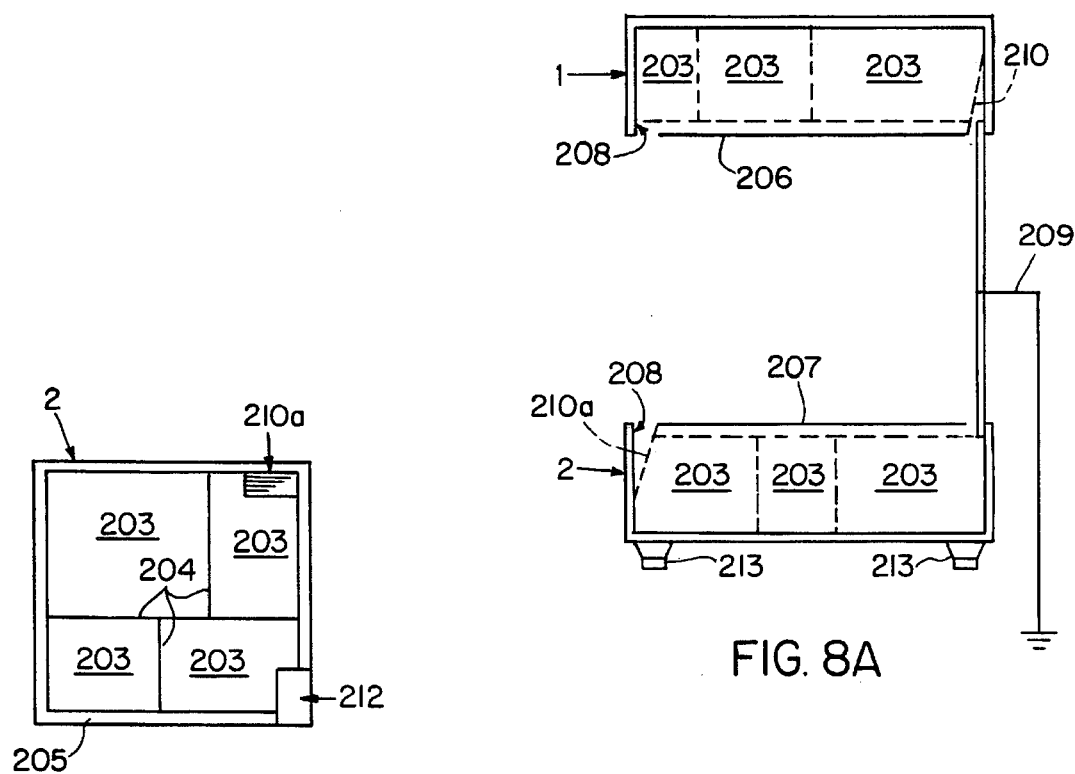
FIG. 8A
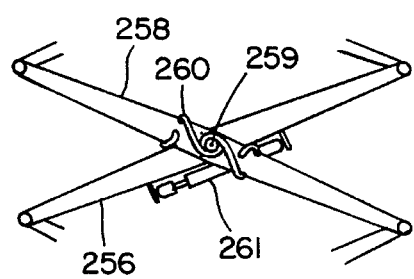
FIG. 8B
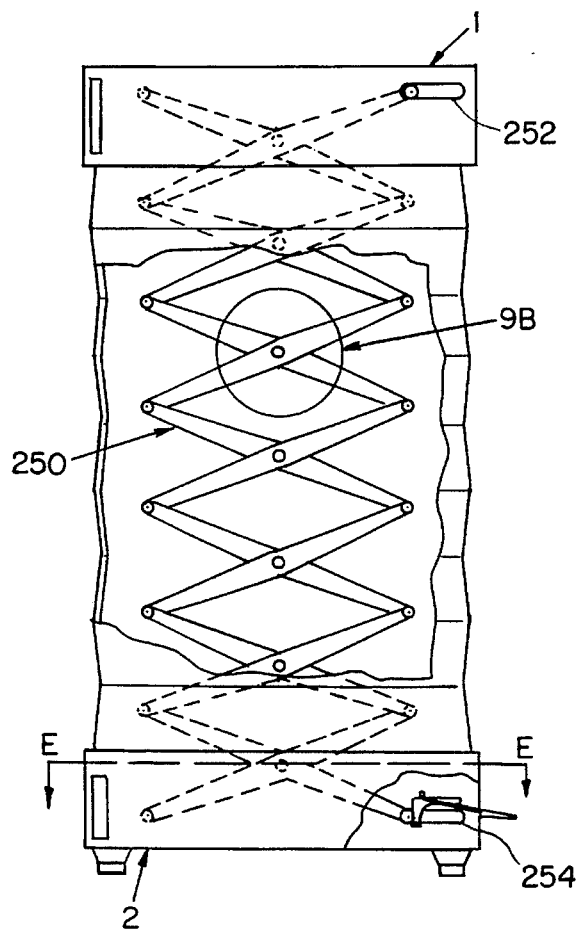
FIG. 9B
FIG. 9A

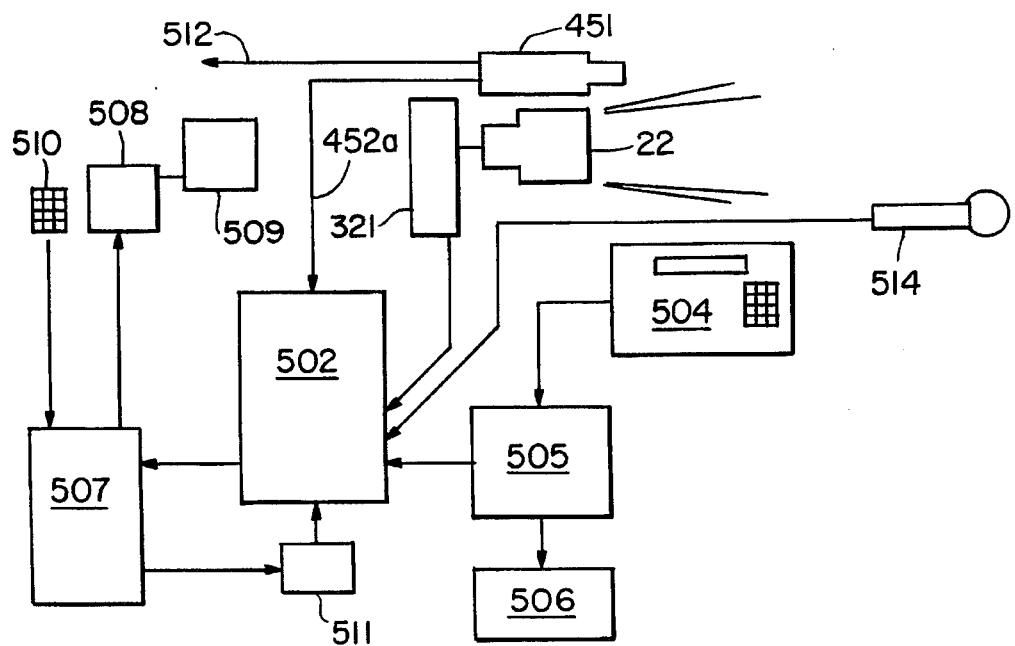
FIG. 17
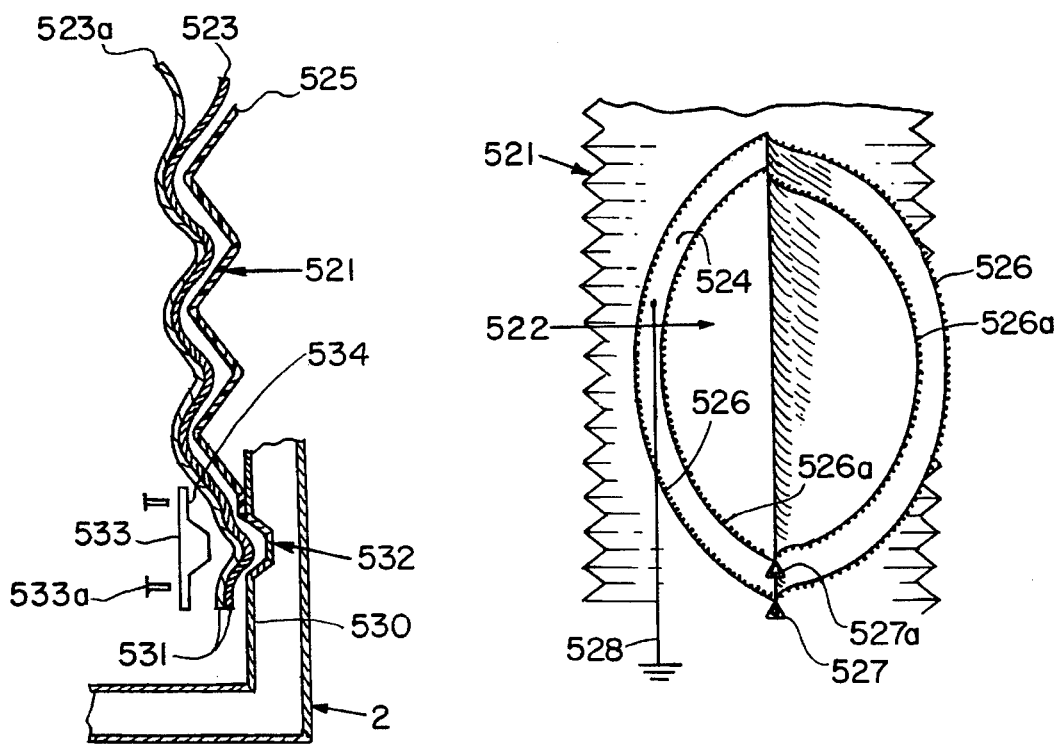
FIG. 18A
FIG. 18B

PORTABLE SECURE-TELEPHONE COMMUNICATIONS MODULE

FIELD OF INVENTION

This invention relates to a portable secure communications module that provides for truly secure remote communications from an easily portable location.

BACKGROUND OF INVENTION

For many years there has been much effort made to maintain the confidentiality of conversations between parties over telecommunications equipment. Conversations that are carried out on telephonic equipment are particularly vulnerable to eavesdropping, as the eavesdropper has a number of options that may be used to intercept voice audio from the telephone conversation. One option is to penetrate the telephone circuit between the telephone instrument and the telephone company switching office; there exist a wide variety of eavesdropping devices that can be connected to the telephone circuit for monitoring the conversation.

To meet this eavesdropping threat, there have been developed a number of types of telephone voice encryption devices that digitally encode the voice before transmission and decode at the receiving end; for example, units that utilize high-grade algorithms, such as U.S. Data Encryption Standard (DES) and proprietary algorithms, preferably in conjunction with RSA Public Key Technology (RSA Data Security, Inc., Redwood City, Calif.), such as the Motorola, Inc., Government Electronics Group (Scottsdale, Ariz.) SECTEL series, or unique systems such as the U.S. government STU-III. In most cases, commercial telephone encryption equipment cannot provide total voice security due to the eventual breakdown of intercepted data, but remains the equipment of choice for use on telephone lines when the conversational content is sensitive in nature. Whatever security provided by telephone encryption equipment, however, is cancelled if the eavesdropper has targeted the room that contains the secure telephone equipment. Although such eavesdropping will only provide one side of a conversation, that may be sufficient to provide the intelligence needed to accomplish the mission at hand.

Accordingly, there has been much effort directed toward protecting the room or area containing the telephone equipment from eavesdropping. An eavesdropping method commonly used is to intercept the room audio and transmit it with a radio frequency transmitter planted in the room, in a person's clothing, or in a small object that a person would use—such as a pen or pocket calculator. Other methods of intercepting room audio use carrier current devices attached to existing building AC wiring; such systems transmit converted room audio to a compatible remote receiver. A concealed, hard wired microphone is another method. Laser monitoring systems which may be located in a nearby building utilize an invisible laser beam to monitor either an object in the room or a room window which may be emulating room audio. Another method exists that utilizes remotely generated microwave RF frequencies and a concealed, passive cavity device in the target area. Devices operating in the near-infrared (IR) range deliver modulation via non-visible light waves and may be intercepted through target room windows using specialized receiving equipment from considerable distances. All of these methods depend on delivery from the target room of a modulated signal that is transformed back into an audio signal at a remote location, commonly known as a listening post (LP).

A highly sophisticated method of eavesdropping is to monitor RF and low frequency magnetic emissions that may emanate directly from internal circuit components of a particular device. The study of such emanations is known in security circles as "tempest". In the case of a secure telephone instrument, it is possible to intercept emissions radiated from internal circuit boards in clear voice, prior to electronic encryption processing, thereby compromising user voice security during a secure telephone conversation. Tempest emanations are very limited in range. However, this near-field radiation is a security threat in instances where the eavesdropper is highly skilled, equipped with specialized receiving equipment, and able to occupy an area in close proximity to the target instrument. Tempest emissions can also induce signals into nearby electronic equipment and miscellaneous area wiring, and by this means travel to various remote points where signals can be intercepted. Some manufacturers of security equipment, including secure voice equipment, offer tempest-protected versions of their products; such devices are oftentimes protected by RF filtering and enclosing specific internal components, or the entire device, in metallic, RF shielding material. Similar telephonic devices may be tempest certified in accordance with U.S. government established standards, for example, the GE STU III manufactured by GE Government Communications Systems Division (Camden, N.J.) or the STU III by Motorola Inc. (Schaumberg, Ill.). Another method is to place an entire device in a small RF shielded enclosure. Quality enclosures will provide tempest protection to specifications exceeding −100 dB (20 KHz>1 GHz).

It is also possible for expert lip reading personnel to obtain conversational information using telescopic instruments to directly monitor persons in the room. The utilization of a lip reader, although extremely rare, should not be discounted by the security practitioner.

There are a number of available countermeasures for the protection of room audio. The room or area containing the telephonic equipment may be alarmed and guarded. Also, technical experts can be used to perform technical surveillance countermeasures sweeps (TSCM). Such sweeps, however, afford only short-lived security and cannot be guaranteed due to their technical limitations, the difficulty of performing an exhaustive sweep, and the eavesdropper's possible awareness of the scheduled sweep and subsequent temporary removal or remote deactivation of the listening device. This drawback may be overcome to some extent by installing in the area RF spectrum detection equipment that continuously monitors for extraneous radio signals. Even these systems, however, are ineffective against wired devices such as a microphone with concealed wiring, previously described near-infrared devices, external laser systems, and certain highly sophisticated frequency hopping RF transmitters.

Room audio may also be masked with audible noises designed to constantly modulate, at voice range frequencies, microphone elements or specific surfaces such as walls that may have listening devices planted on the other side, and windows to prevent laser interception. Noise systems of this type use speakers for general noise distribution and mountable transducers for specific surface protection. One type of noise generated by these systems is known as "white noise" (a static sound with energy spread evenly throughout the frequency range of human speech), or music may be generated, or a sound known as "babel".

Babel is a precision mixture of human voices or synthetic voice sounds, recorded on magnetic tape, on optical disk or may be generated from a chip, and is considered to be an effective masking sound. Babel sounds would be most effective if the frequency profile of the babel sounds closely matched the frequency profile of the person speaking. Such an effect may be accomplished by utilizing electronic equipment designed to constantly sample a person's voice. For example, a person's voice frequency range may be used to control the capstan-drive motor speed on a magnetic tape player, affecting tape playback speed, and continuously adjusting the pitch of prerecorded babel sounds generated by the masking system speakers as different system users speak into a dual-purpose communications/voice sampling microphone during secure telecommunications. A system such as this would be highly effective for masking voice audio.

Variations of masking sound generators such as single channel and multiple channel with mixers that generate random, non-stationary masking noises, will also protect room conversation from the eavesdropper but may not be as effective as babel if the eavesdropper has utilized phased array microphones, adaptive filters, or is equipped with sophisticated computer equipment designed to isolate and separate (subtract) masking sounds from actual voice sounds of intercepted audio. All audible masking systems, however, may add noticeably to the noise level in the room and may make listening to a telephone especially difficult; and in any case above, it is imperative that the volume level of masking sounds exceed the room conversation volume level in order to protect room conversations from eavesdropping.

Other versions of masking systems exist that are somewhat effective. One magnetic jamming system utilizes large coils to induce microphone elements or nearby electronics with electro-magnetic masking frequencies. Another ultrasonic system affects microphone elements with inaudible sound waves. Shortcomings of these systems are the size of the magnetic coils, inability to affect all microphone types, complexity of installation, and complaints of nausea by people exposed to powerful ultrasound.

The preferable option for preventing RF transmissions from the room containing the secure telecommunications equipment is to shield the area with grounded metal mesh, foil, or purchase a walk-in RF shielded enclosure system. RF enclosures are constructed as a room within a room that allow for easy inspection of all surfaces of the enclosure. Some of these enclosures are fully soundproofed as well and require no masking equipment. Installing such sealed enclosures, however, is very expensive, and restricts the user to that specific area. The room that contains the RF shielded enclosure is usually referred to as the parent-room.

SUMMARY OF INVENTION

It is therefore an object of this invention to provide a portable secure communications module that provides for high security telecommunications virtually anywhere.

It is a further object of this invention to provide such a device that provides a high level of security for individuals with no technical security training.

It is a further object of this invention to provide such a device that is has electronic means for self protection to prevent unauthorized tampering when stored or when opened and unattended.

It is a further object of this invention to provide such a device that accomplishes total telecommunications security at a reasonable cost.

It is a further object of this invention to provide such a device that accomplishes telecommunications security without the need for continuous, expensive, technical surveillance countermeasure sweeps to ensure audio security during secure communications.

It is a further object of this invention to provide such a device that requires only one person to rapidly set up the equipment for use.

This invention results from the realization that truly effective secure telephone communications may be inexpensively accomplished by providing a portable, collapsible enclosure that is RF and IR shielded and contains secure remote telephone communications equipment such as a digital encryption telephone.

This invention consists essentially of a portable secure communications module that includes a collapsible enclosure for holding a person desiring to perform secure remote communications with a secure remote telephone communication device in the enclosure along with means for sealing the enclosure to inhibit RF leakage to prevent eavesdropping from outside the enclosure. Preferably, the enclosure includes a collapsing frame which may include pantograph wall members with a rigid base and top member at the ends of the frame in which the frame folds into at least one of the base and top members so that, when collapsed, the entire unit is the size of the base and top members put together. In that case, there may further be included means for fastening together the base and top members when the enclosure is collapsed to form an easy-to-move unit. Handles and wheels on the unit may also be provided so that the module may be easily moved when collapsed.

The enclosure preferably includes an automatically collapsible seat, automatically folding instrument cluster and writing surface for the user, as well as internal lighting.

The enclosure may be RF shielded with a metallic substance that is preferably in the cover and also in the base and top member, such as metallized rip-stop nylon substrate, metal foil or metal screening. The frame covering is preferably flexible so that it collapses with the frame so that it does not have to be removed from the module. Preferably, the cover is opaque to prevent the passage of non-visible light energy and to prevent visual eavesdropping.

The audio masking system may also include means for preventing remote, hostile laser systems from receiving intelligence via audio-based vibrations caused by the user's voice and affecting the module enclosure covering. This may be accomplished by transmitting into the cover, base and top cabinet sections, broad band noise spread evenly over the frequency range of the human voice. There may also be included means for projecting noise from the enclosure into the parent room to mask the voice leakage from the enclosure. This noise may be recorded or synthetic babel or other suitable non-stationary masking sounds. Preferably, the noise is projected when the person is speaking to make it easier for the user to hear conversations over the secure communication device. The level of masking noise projected from the enclosure is preferably automatically adjusted as the user inside the enclosure speaks into the telephone equipment.

Module utility penetration points are secure from RF leakage by including RFI/EMI filters for electrical and telephone lines that enter the enclosure. The enclosure preferably is ventilated by one or more ventilation fans in combination with honeycomb waveguide, RF shielded external air-conveying openings to prevent RF leakage. Preferably, the ventilation system operates automatically as the user sits on the module seat. The system may further include a video camera for external monitoring from the module along with means for directing the video camera view to allow surveillance under the control of the module user.

The module may include a sound-absorbing material covering a portion of the enclosure interior, for example cloth, carpeting, or professional sound absorbing material, for inhibiting leakage of sound from the module interior. There may further be included photosensitive means such as photo detectors for detecting light on the enclosure outside to determine when an enclosure dark storage area has been compromised. There may also be included wireless communication means for offsite signalling of the module status. Still further, there may be motion detection means such as a passive infrared detector (PIR) which communicates with the enclosure outside for detecting motion in the area outside the module, particularly useful for when the module is open and unattended to determine if someone such as an intruder has entered the room in which the module is stored. There may be included in the flexible module cover one or more metallic zippers electrically communicating with the metallic substance in the cover for providing an RF shielded opening in the flexible cover for the user to enter and exit the module.

The module may further include an external signal beacon for indicating when the module is in use and some means for testing for RF leakage from the shielded enclosure and one or more module tamper alarms that may be activated when the enclosure is collapsed to deter enclosure tampering when it is stored. The module also contains a sophisticated security system that operates in conjunction with the PIR unit stated above for protecting the unattended parent room. The system utilizes internal, automatic switching devices that select the proper security mode as the user opens the module—off premise; slow scan video monitoring of the parent room is also available when the module is open.

DISCLOSURE OF PREFERRED EMBODIMENTS

Other objects, features and advantages will occur to those skilled in the art from the following description of a preferred embodiment and the accompanying drawings in which.

Figure 1:
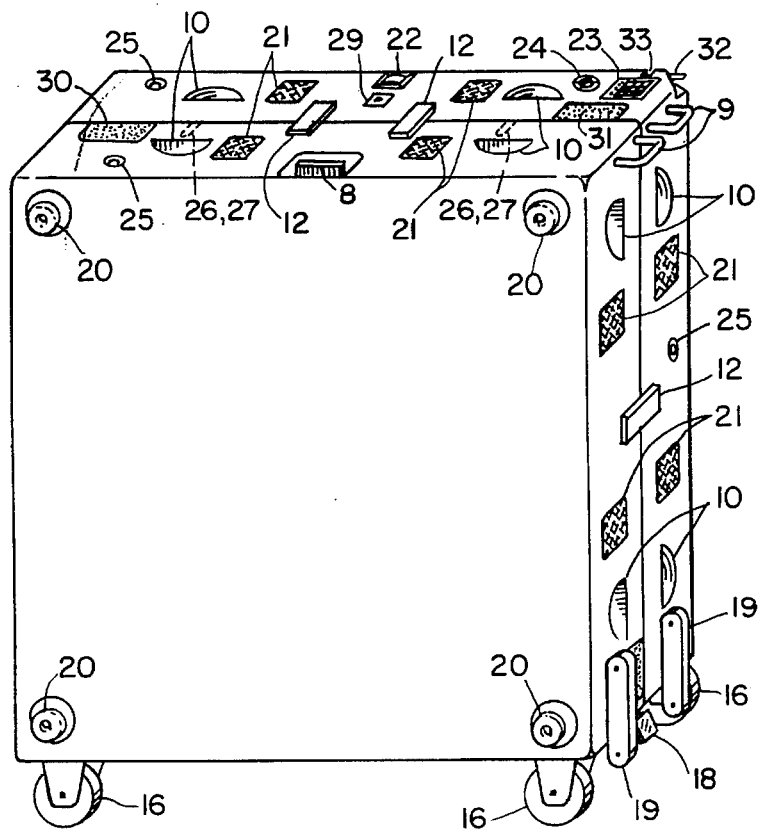
FIG. 1 is an axonometric view of a portable secure telephone communications module according to this invention in the closed position ready to be transported.
Figure 7A:
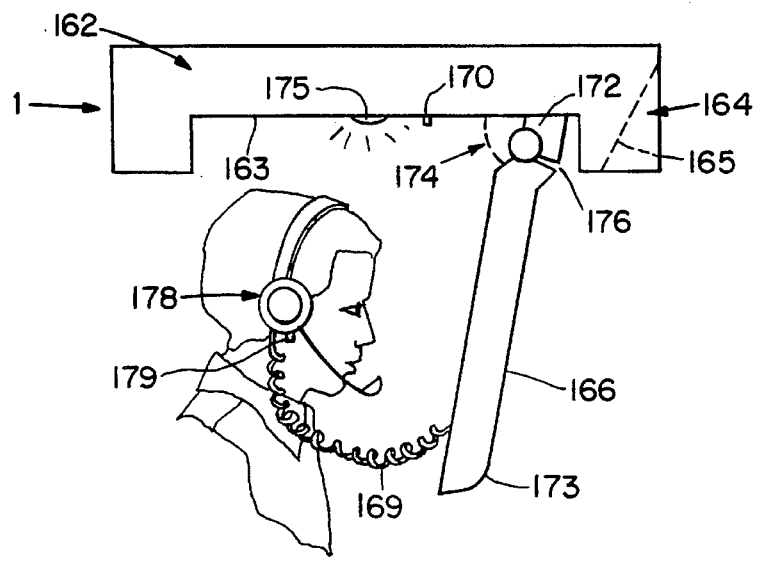
Figure 7B:
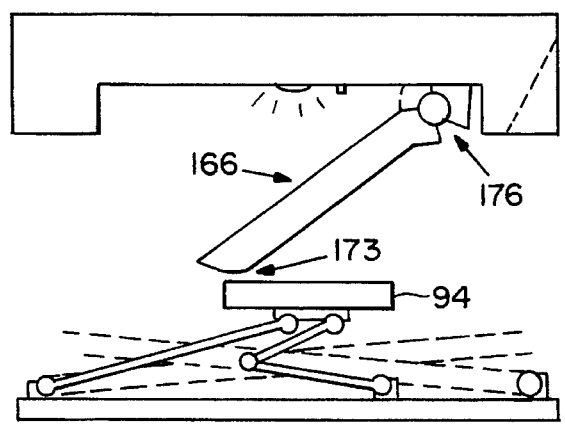
Figure 7C:
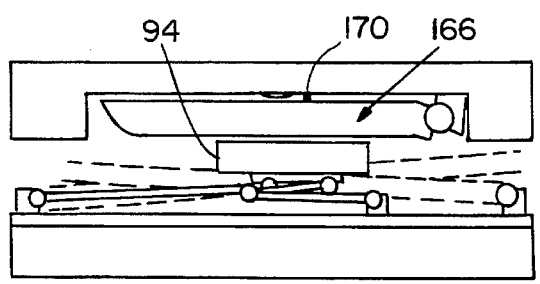
Figure 7D:
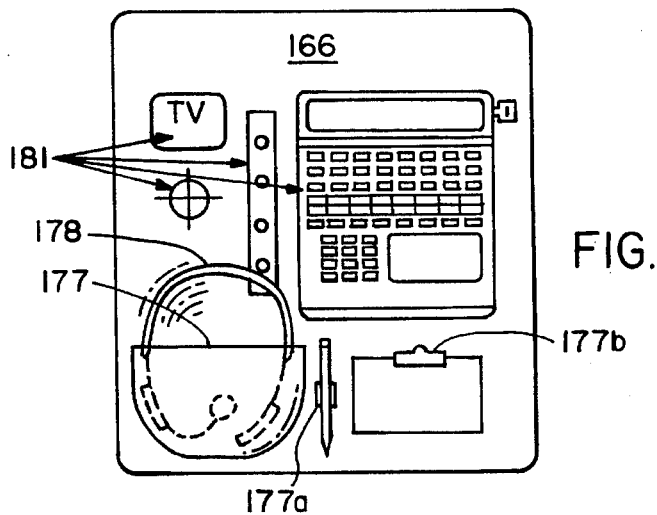
Figure 7E:
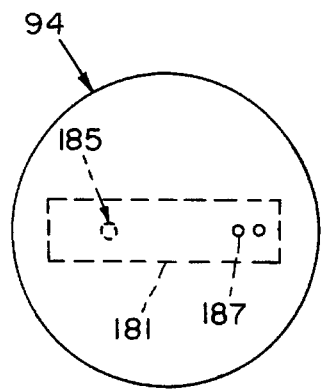
Figure 7F:
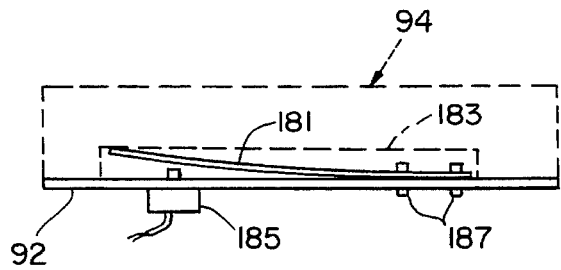
Figure 7G:
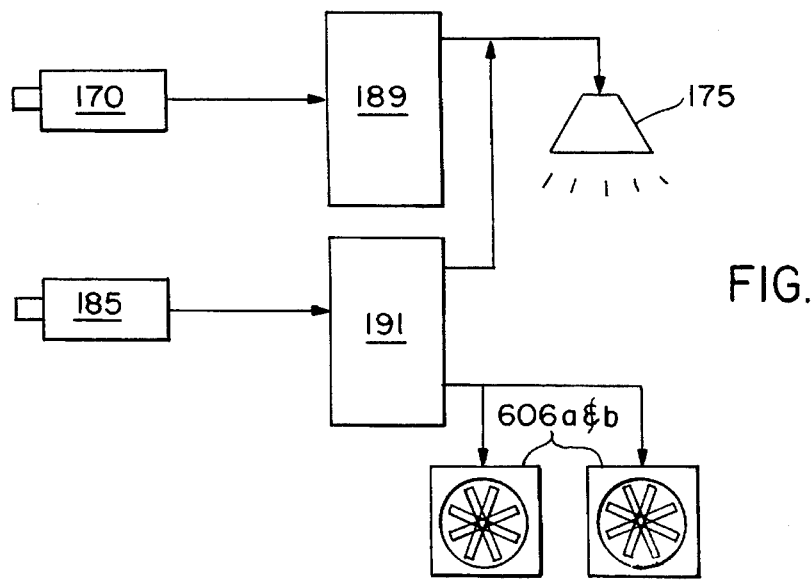
Figure 9C:
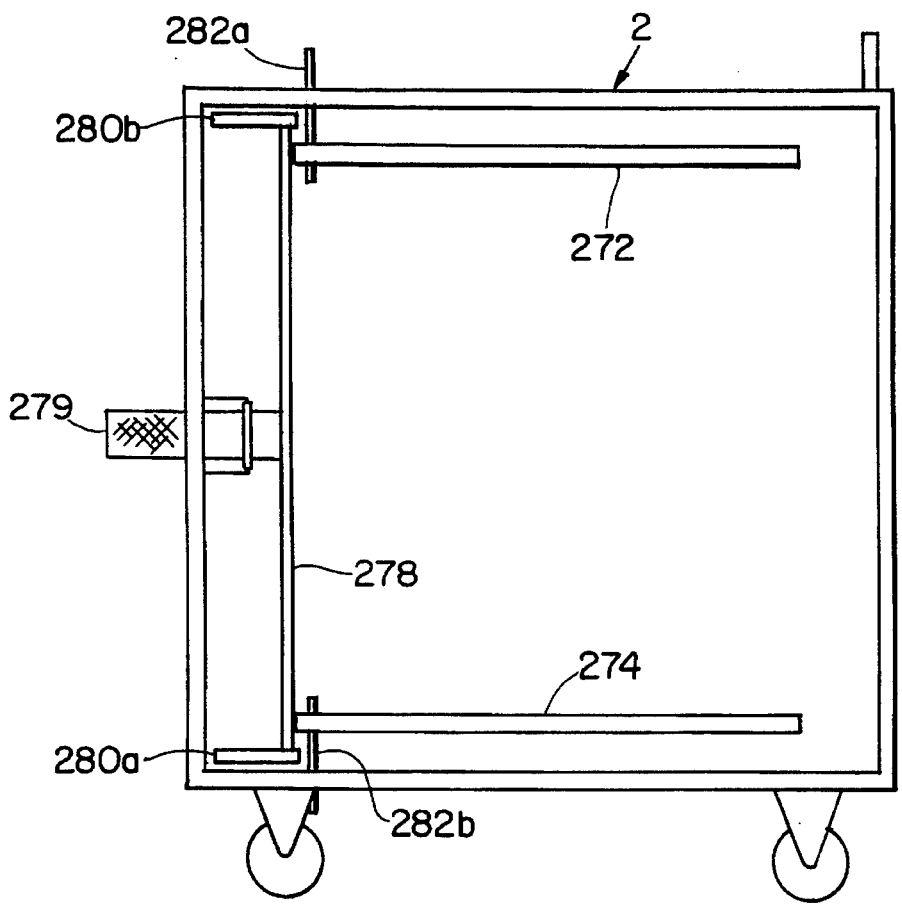
Figure 9D:
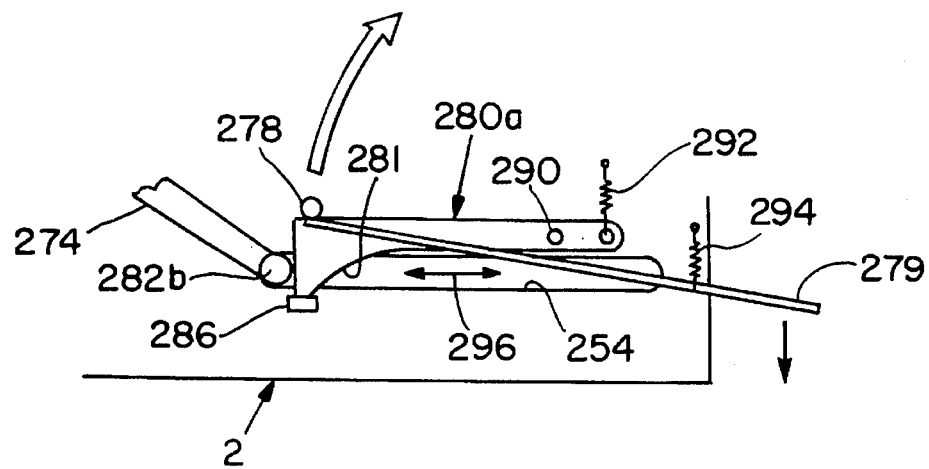
Figure 10:
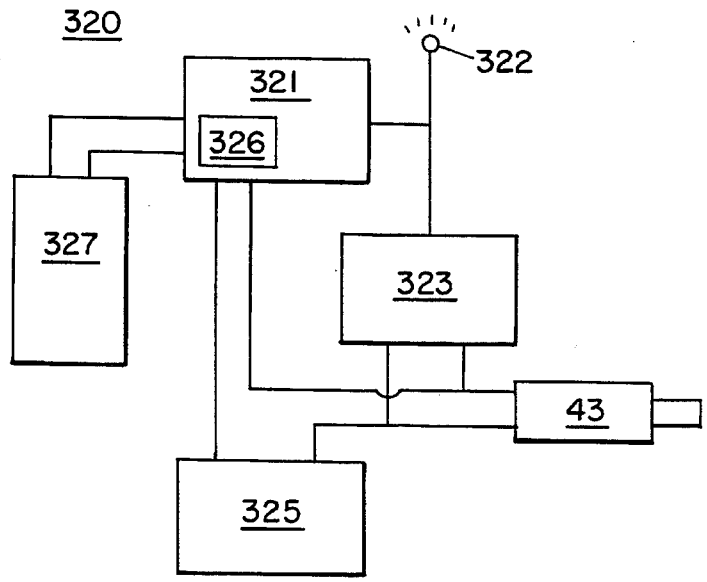
Figure 11:
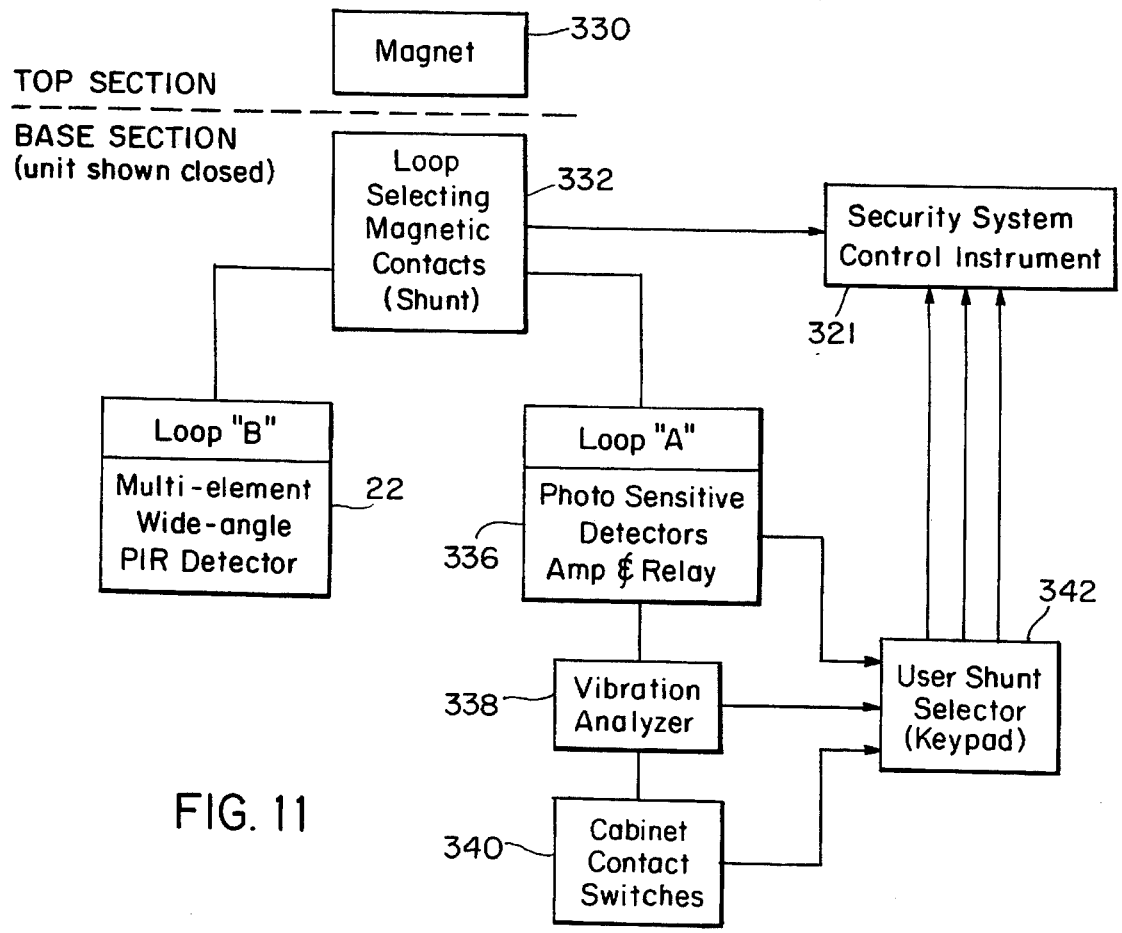
Figure 12A:
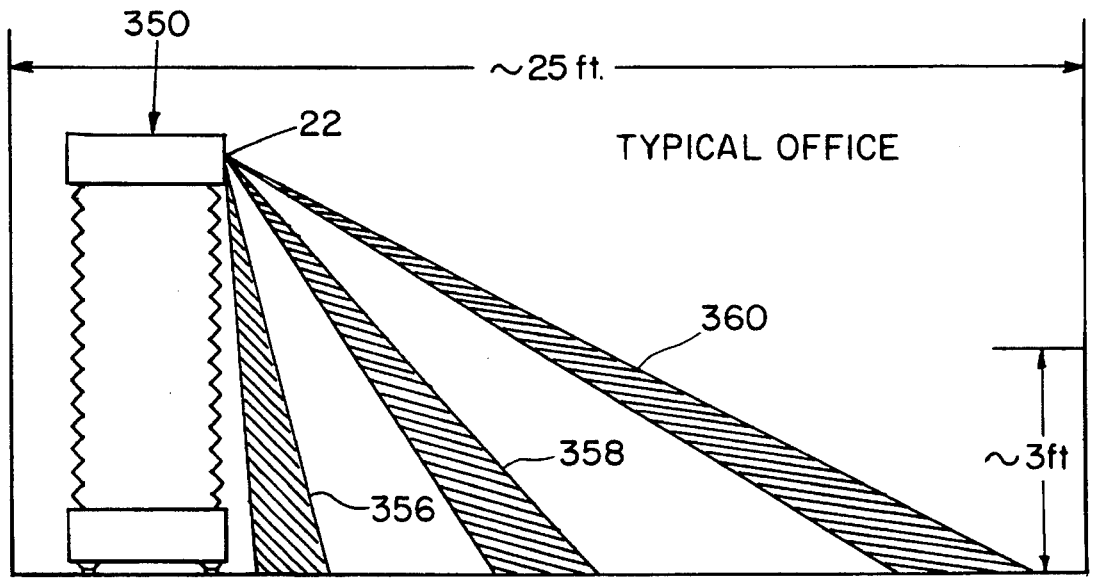
Figure 12B:
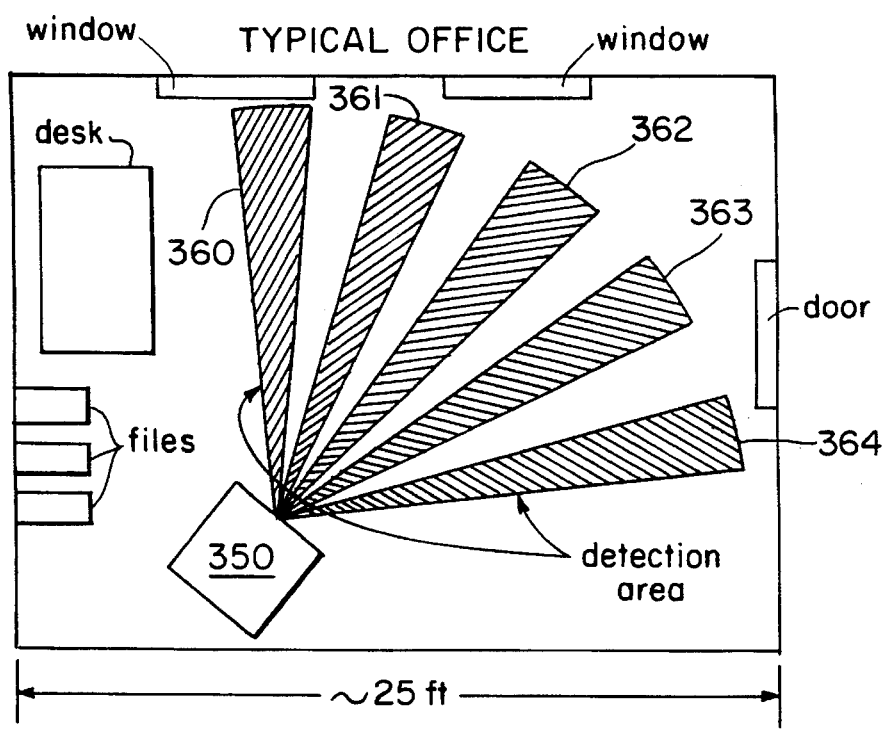
Figure 13A:
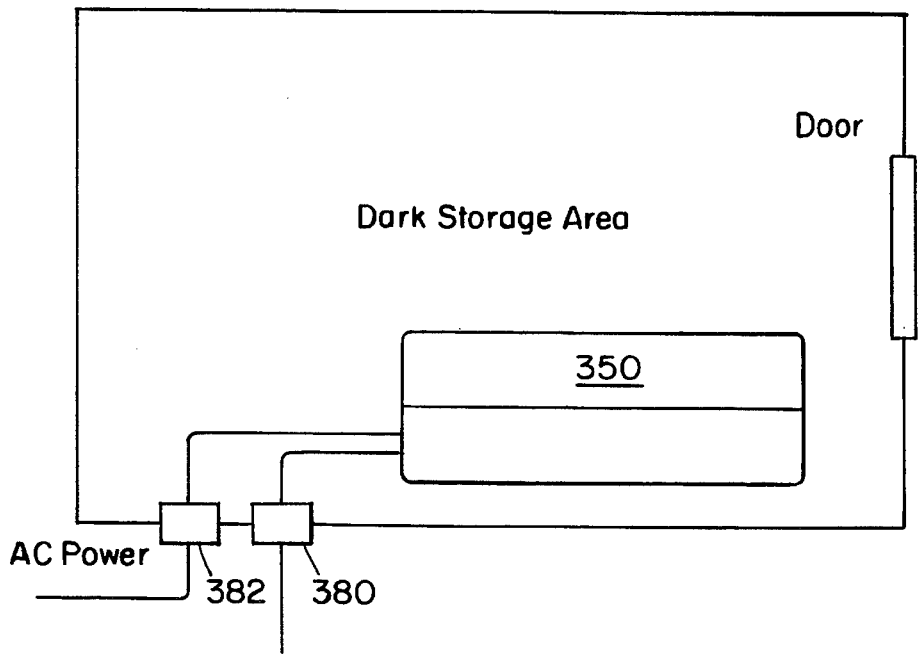
Figure 13B:
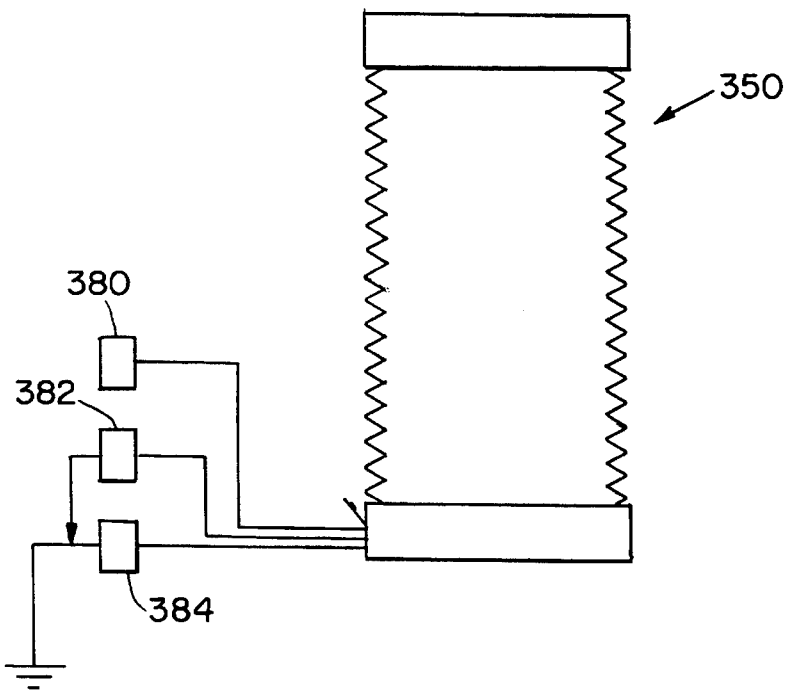
Figure 14A:
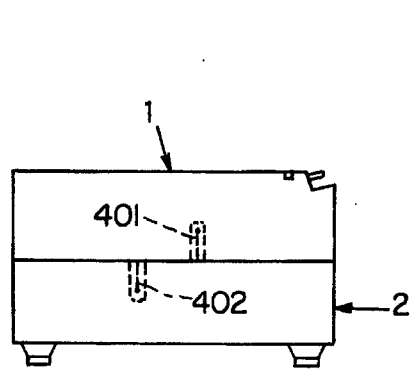
Figure 14B:
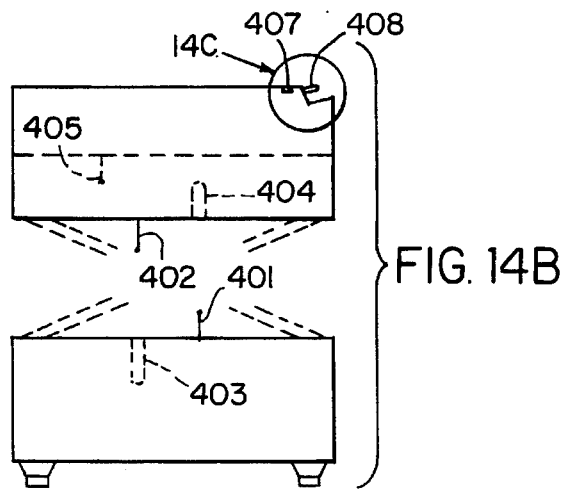
Figure 14C:
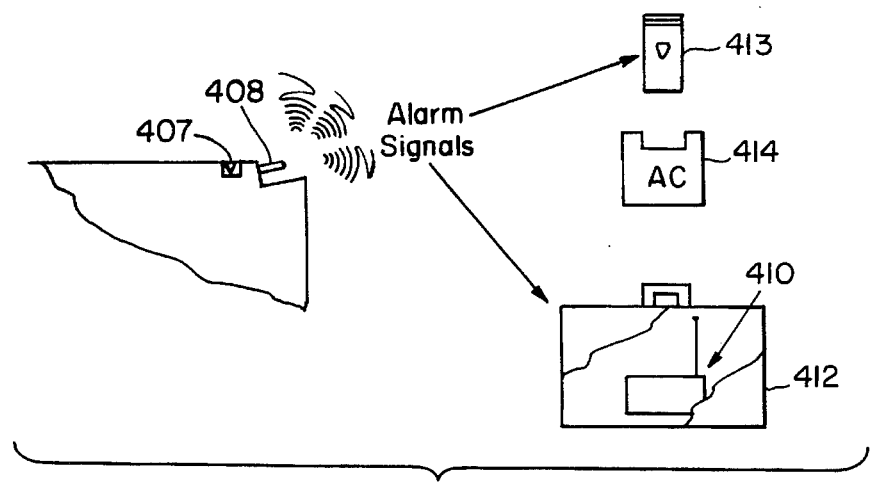
Figure 15:
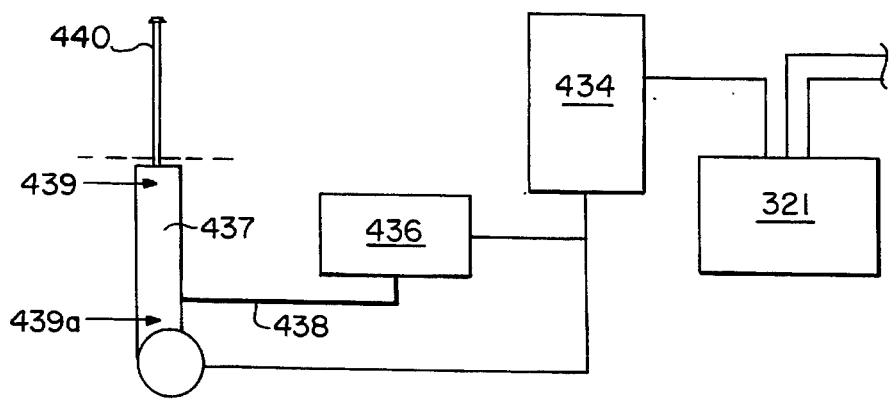
Figure 16A:
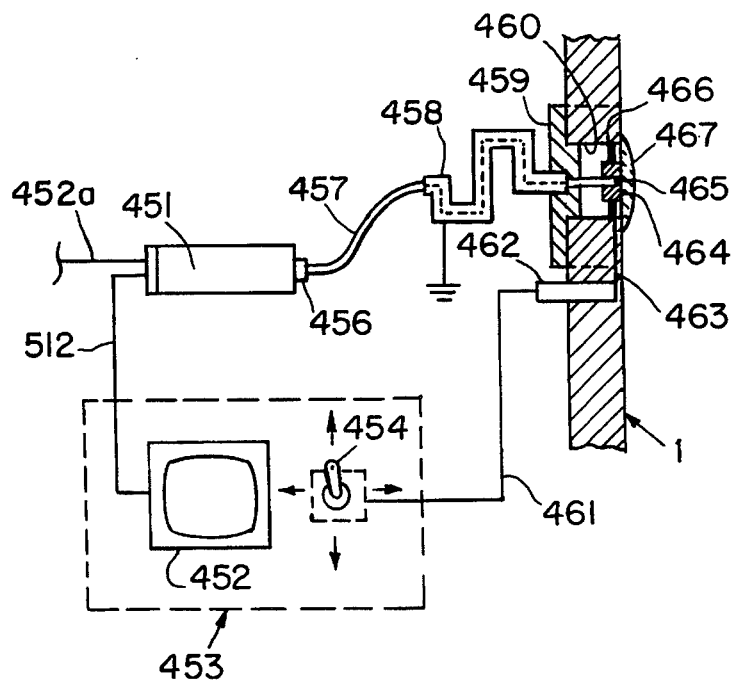
Figure 16B:
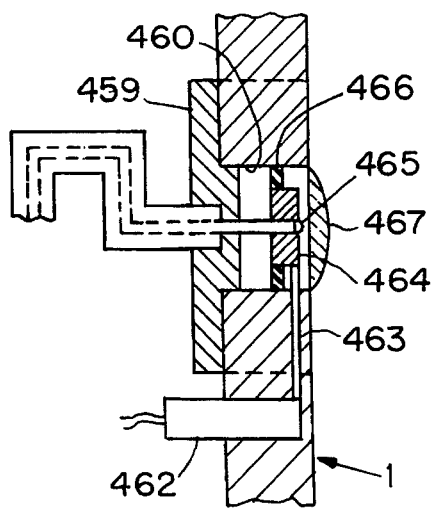
Figure 16C:
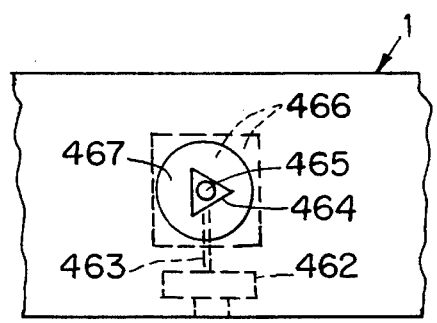
Figure 18C:
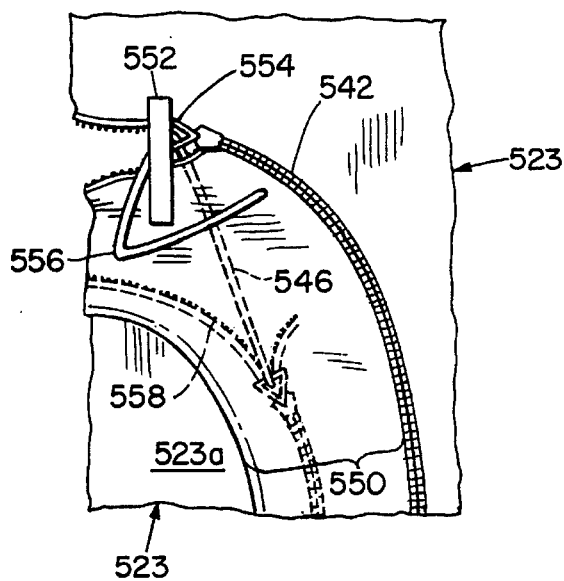
Figure 18D:
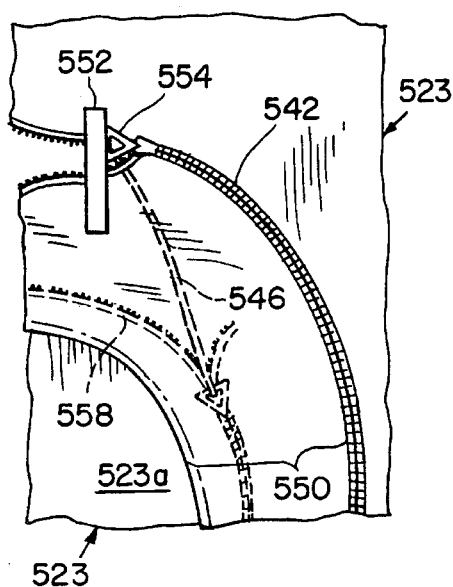
Figure 19:
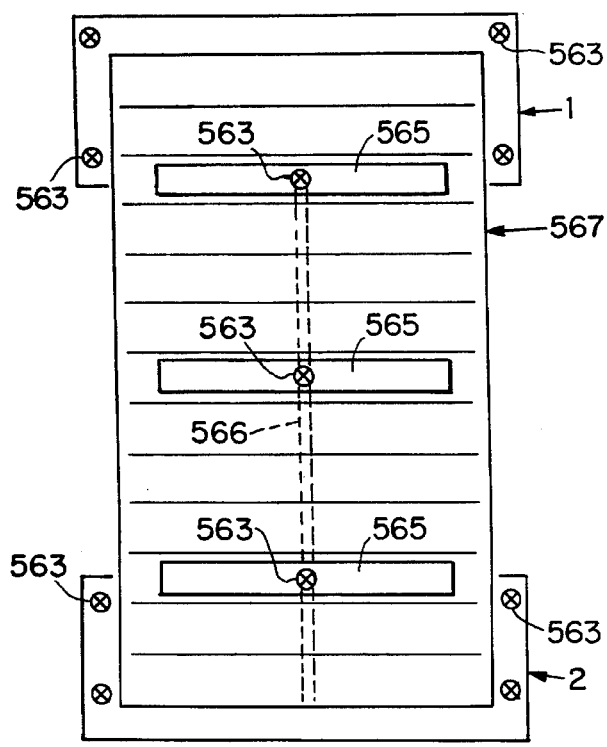
Figure 20:
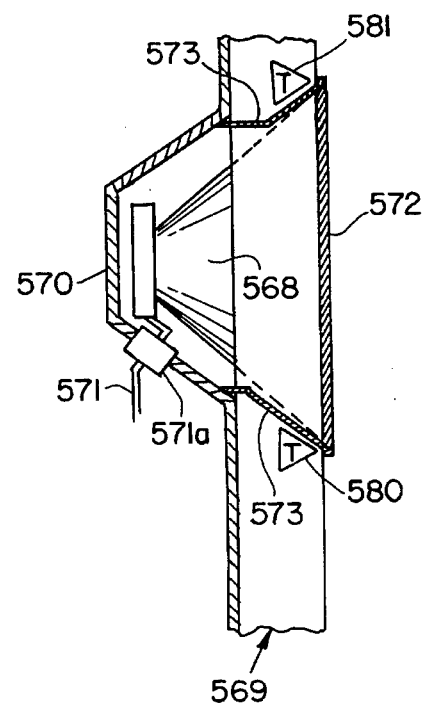
Figure 21A:
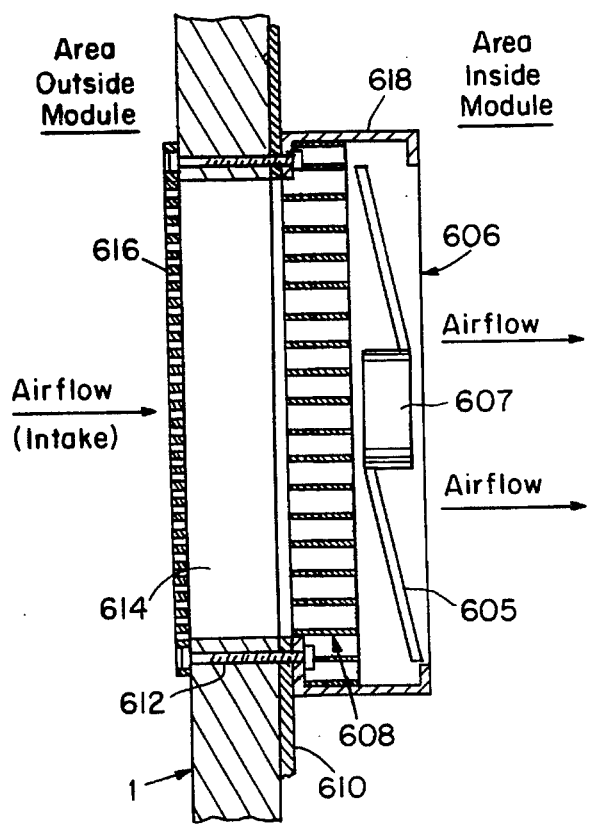
Figure 21D:
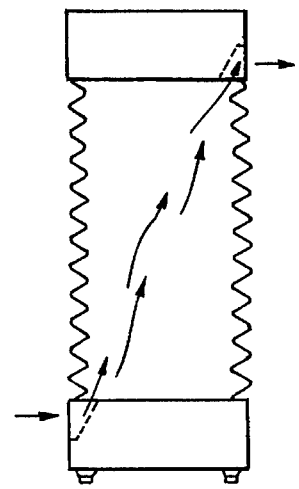
Figure 21C:
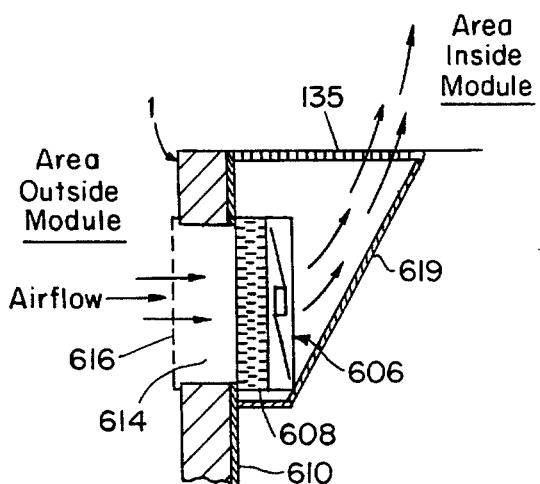
Figure 21B:
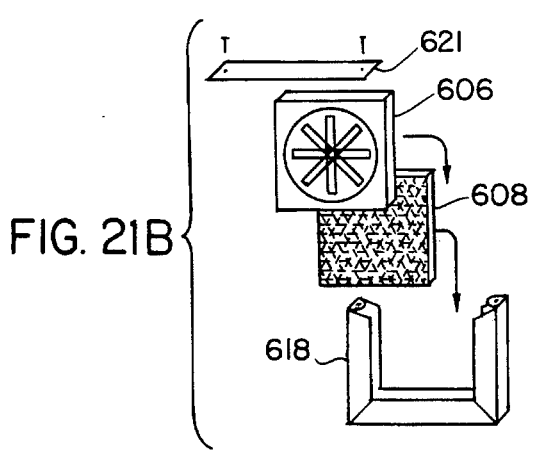
Figure 22A:
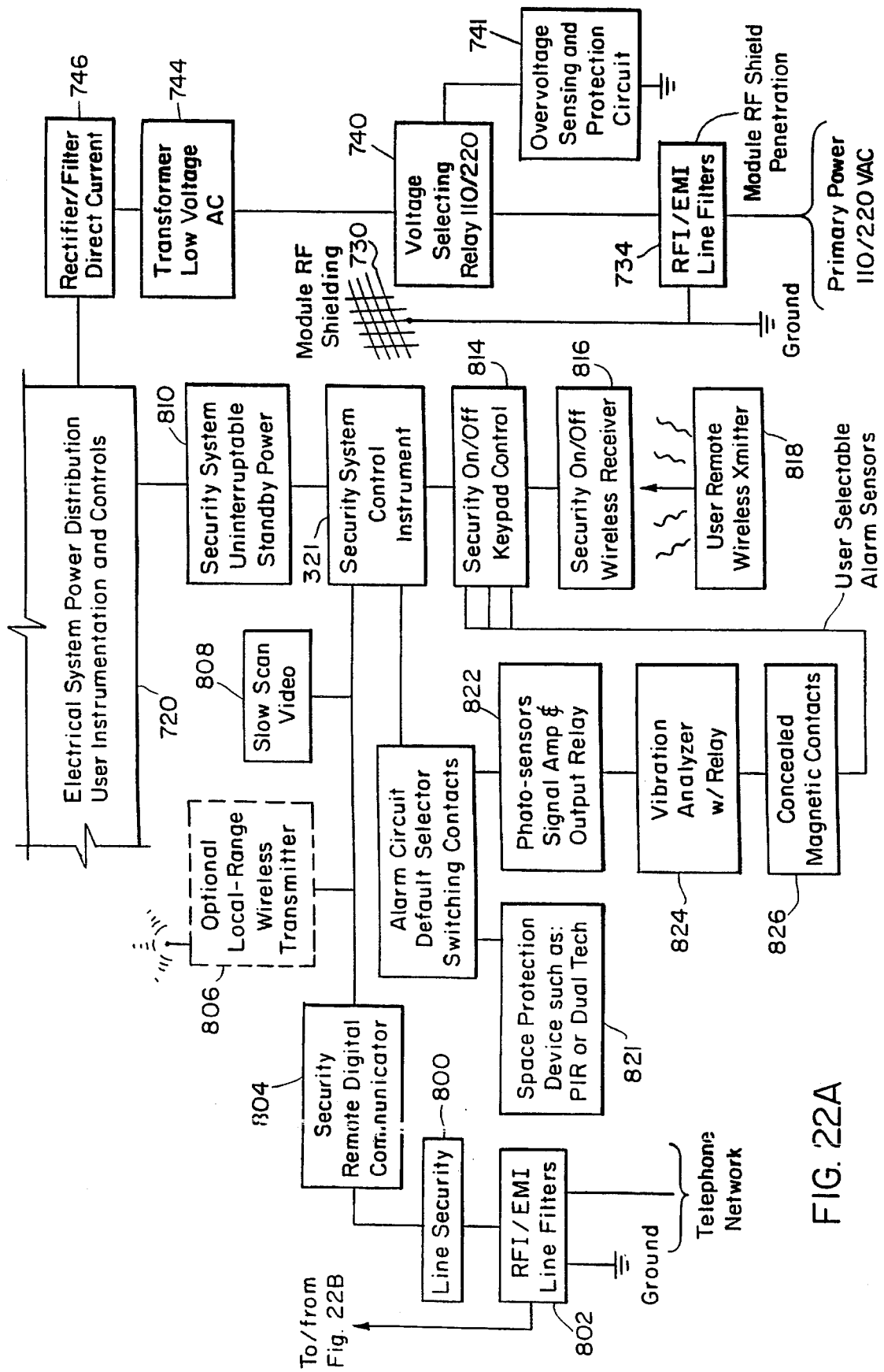
Figure 22B:
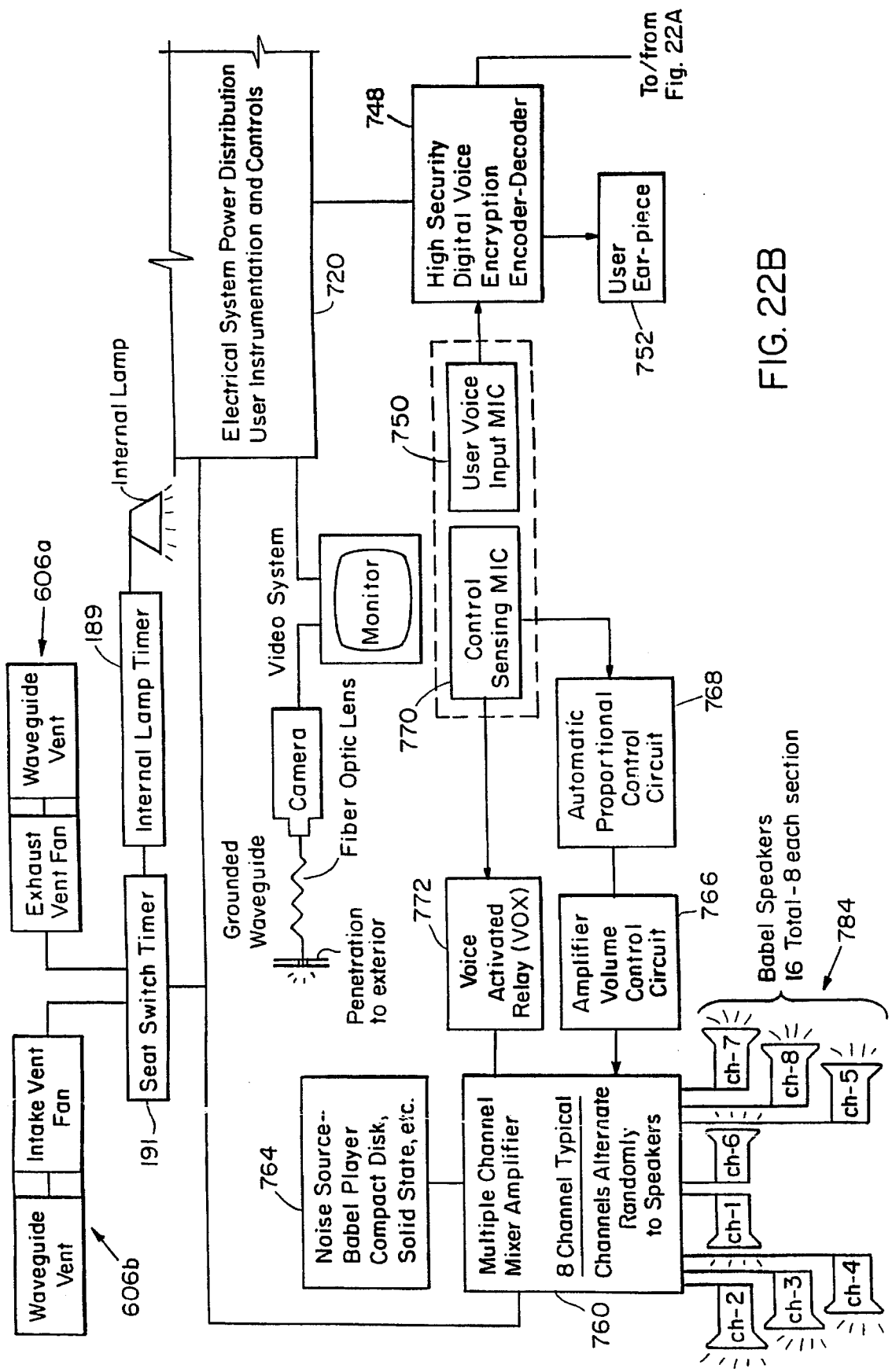
Figure 22C:
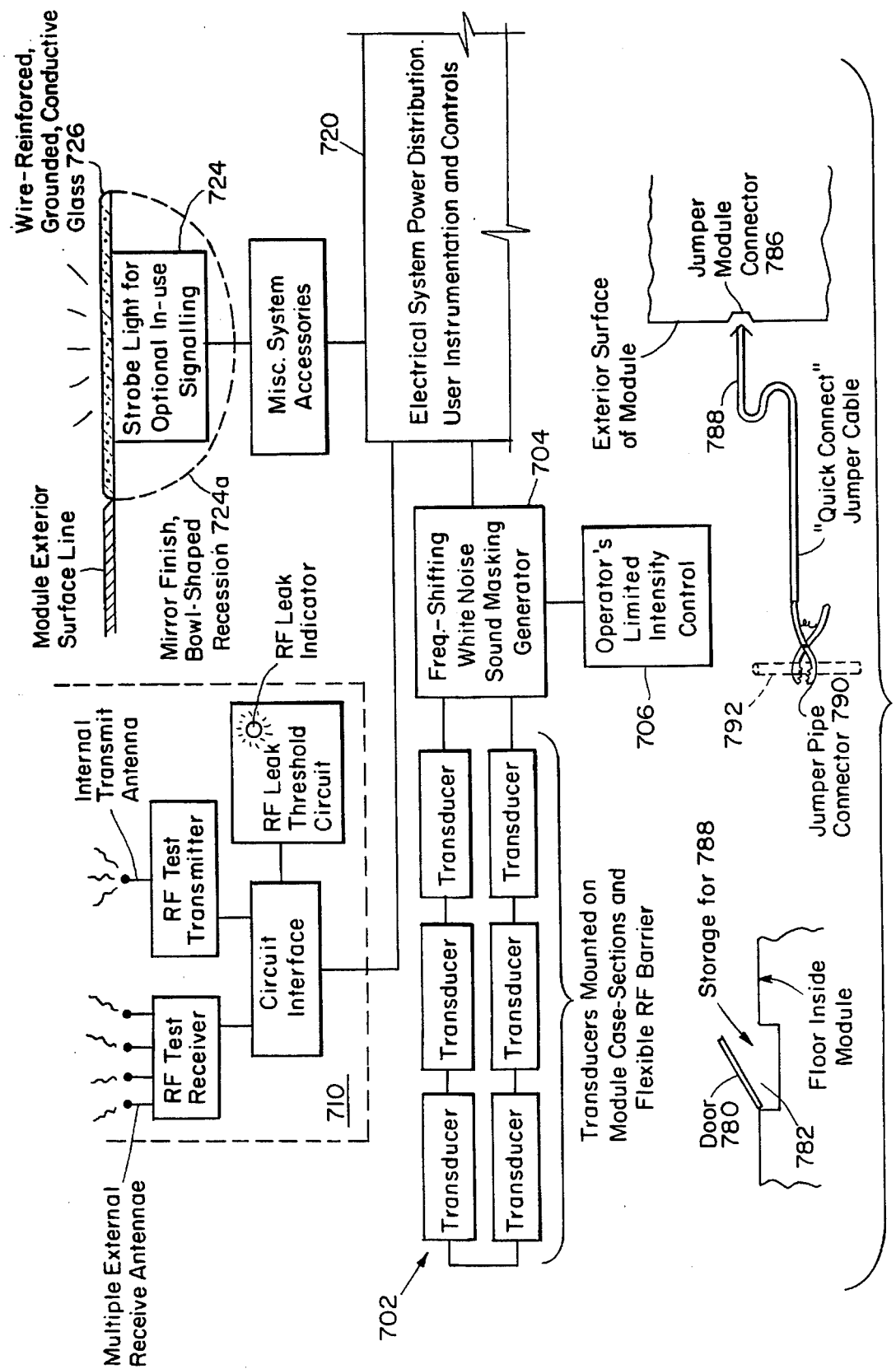

FIGS. 7A through 7C detail the operator instrument cluster of the module of FIG. 1 in the extended, retracting and retracted positions, respectively;

FIG. 7D is a front view of the instrument cluster of FIGS. 7A through 7C;

FIG. 7E is a top view of the seat of FIGS. 7B and 7C;

FIG. 7F is a cross-sectional view of the seat of FIG. 7E detailing the seat switch;

FIG. 7G is a schematic diagram of the interior light and fan control using the seat switch of FIG. 7F;

FIG. 8A is a schematic cross sectional view of the upper and lower case-section RF liners and tempest sub-enclosures of the module of FIG. 1;

FIG. 8B is a top view of the base section of the module depicted in FIG. 8A;

FIG. 9A is a schematic partly broken away view of the pantograph assembly of the module of FIG. 1;

FIG. 9B is a detailed view of a portion of the pantograph of FIG. 9A;

FIG. 9C is a cross section taken along line E—E of FIG. 9A;

FIG. 9D is a detailed view of the operation and locking means of the pantograph of FIGS. 9A through 9C;

FIG. 10 is a schematic representation of the automatic shunt circuit for the power supply cutoff switch of the module of this invention;

FIG. 11 is a schematic block diagram of the security system automatic loop selector circuit of the module of this invention;

FIGS. 12A and 12B are side and top schematic views, respectively, of one intruder detection security system for the module of this invention;

FIG. 13A is an overhead view of the module of this invention in a dark storage configuration;

FIG. 13B is a schematic representation of the external connections of the module of this invention;

FIGS. 14A and 14B are schematic views of the module of this invention in the closed and open position showing the locations of various security transmitting and receiving antennas;

FIG. 14C is an enlarged view of one IR receiving element and one transmitting antenna of FIG. 14B along with two remote receiving means;

FIG. 15 is a block diagram of an automatic-extend/retract pager signal, or cellular telephone antenna for the module of this invention;

FIG. 16A is a cross sectional view of a closed circuit television monitoring system for the module of this invention;

FIG. 16B is an enlarged view of a portion of the system of FIG. 16A;

FIG. 16C is a front view of the system of FIG. 16A;

FIG. 17 is a block diagram of a slow scan, still picture, video transmission security system for the module of this invention;

FIG. 18A is a cross sectional schematic view of the flexible covering and RF screening or foil material for the module of this invention;

FIG. 18B is a partial front view of the covering and sealing means of FIG. 18A;

FIGS. 18C and 18D are enlarged detailed views of a method for accomplishing overlapping zipping enclosures depicted in FIG. 18B;

FIG. 19 is a schematic view from the module interior of mounted white noise transducers of a protective masking system for the module of this invention;

FIG. 20 is a cross sectional view of a babel-projecting speaker for a protective masking system of the module of this invention;

FIG. 21A is a cross sectional view of the intake port for the ventilation system of the module of this invention;

FIG. 21B is an exploded view of the ventilation system of FIG. 21A;

FIG. 21C is a second cross sectional view of the ventilation intake port of FIG. 21A shown within an airflow baffle;

FIG. 21D is a schematic cross-sectional view of the module showing the general forced air flow direction; and FIGS. 22A through 22C are a block diagram of the electrical system for the module of this invention.

There is shown in FIGS. 1 through 4 the portable secure telephone communications module of this invention in the closed, opening, and open position. The module includes a two part cabinet with top section 1 and bottom section 2. The module includes an internal pantograph-type skeleton structural assembly that provides a collapsible and expandable locking pantograph skeleton for maintaining the module in the open position to create an enclosure that can hold a person desiring to make secure-voice telephonic communications. The pantograph assembly is shown in more detail in conjunction with FIGS. 9A through 9D.

The module includes, completely covering the pantograph as well as connecting to rigid metallic linings in the top and bottom section of the cabinet, a flexible, opaque, Radio Frequency (RF) and light barrier 4 that may be comprised of flexible, metallic shielding material such as metallic coated rip-stop nylon fabric sold by the Flectron Division of the Monsanto Company (St. Louis, Mo.) or similar products sold by International Paper Corporation, Veratec Division (Walpole, Mass.) for preventing the passage of RF energy. Overall, the layered module RF shielding will provide RF protection to a minimum frequency of 1 GHz with attenuation of at least −70 dB as well as protect from the passage of near-infrared light in the region of the infrared spectrum usable for modulated transmission. The barrier of the module will prevent interception of transmitted user-voice audio during secure-voice communications via clandestine RF or IR transmitting devices carried into the module unknowingly by the user. Flexible RF/IR barrier module covering 4 includes permanent creases 5, on an outer, flexible, permanently creased, second layer, that provides guidance for the metallic/nylon layer and gives the module an accordion appearance for uniform folding so that the RF/IR barrier can easily collapse into the top and/or bottom cabinet sections.

The user enters the module through outer RF sealing door flap 6a and inner RF sealing door flap 6b, shown in more detail below. Each door flap has a zippered pull 7.

Included accessible from the outside of base section 2 is a pantograph release pedal 8 used to collapse pantograph 3, shown in more detail below. Retractable and extendable locking handles 9 are provided for ease of handling in the collapsed position so that the module can be easily steered, pulled up and lowered down stairs in conjunction with wheels 16. Walking behind the module without an extended handle, while pushing the unit, would be difficult due to limited space for the person's feet. Handles 10 are provided for ease of lifting the module while it is being transported. Concave area 11 behind handle 10 is provided so that the user may easily grip the handle 10 without the need of handle 10 breaking the profile of the module.

Locking latches 12 and locking-latch mating components 13 are provided so that the module may be locked in the closed configuration. When closed, the latch/lock assembly provides an aligned hole through both components so the user may insert through the holes proprietary lead and wire seals such as Budco (Tulsa, Okla.) No. 134, and seal with a hand-held sealing tool fitted with custom proprietary dies, such as Budco No. 823 Cut-R-Press dual purpose, seal press/wire cutter tool. Power/ground and telephone cables 15 provide power for the module, ground the RF shielding, and transmit/receive the telephonic communications into and out of the module.

Wheel anti-roll brake assembly 17 may comprise metal plates that contact the tires when applied to ensure stable parking of the unit, as found in many baby carriages. A brake would be particularly important to temporarily hold the module from rolling as the user unlocks and opens a vehicle door to load the module for transportation, for example, on a sloped driveway, parking lot, loading dock, etc. The user depresses pedal 18 to lock/unlock the brake assembly 17: one step to lock and one step to unlock (a simple cam-type mechanism). Also included are belt rollers 19 as found on two wheel dollys to facilitate movement up and down stairs. Floor insulators 20 are soft cushions that separate the module from the floor to preclude hostile interception of vibrations in the ceiling of the room below the module as a means of intercepting the conversation taking place within the module, prevent the module from sliding on hard floors, and protect the lower case section from scratches.

The module includes a number of sound masking system speakers 21 that project masking sounds into the parent room as described below. Two speakers are included on each of the four flat sides of the upper and lower case sections of the module, a total of 16 speakers. Also included is a passive infrared detection device (PIR) 22 for monitoring the space in front of the module when the module is open, not in use, and the surrounding area is unattended. When used in this manner, the module becomes a rapid deployment security device capable of detecting a parent room intrusion and the off-premise notification of the intrusion via the local telephone company switched network or by wireless RF transmission. Currently available PIR units such as Napco Security Systems, Inc., (Amityville, N.Y.) Model 5050 "Super Quad" and Aritech Corp. (Hickory, N.C.), Model PR383 "Premier" provide for an extraordinary level of false alarm rejection through the use of multiple sensing elements, pulse counting, or signal-analyzing microprocessors. PIR units contain a "walk-test" LED (light emitting diode) designed for technicians to use when installing a unit to identify detection patterns, such as those shown in FIGS. 12A and 12B. In the preferred embodiment, the module PIR should have the walk-test LED operational when standing by and off when the security system is armed. This methodology will allow the user to "see" the sensitive areas in a parent room and know when he/she is clear of the zones as well. This will permit arming the security system, with the wireless transmitter, in the "instant mode" without a false alarm and provide no entry delay and no "walk-test" LED for an intruder, thus support superior "surprise" intruder-ID video operations via the video transmission system described below. The PIR unit is mounted flush on the module or in a recessed area to effectively protect it from damage during transportation.

The module also includes an external security system digital keypad 23 for access to the security system, including user control of selectable system features as described below. Security system warning/verification sounder 24 is also further described below as are photo-sensitive detection elements 25, RF-barrier leak-test system antennae 26 and cylindrical receiving cavities 27 for the test antennae. Optional strobe light 28 is included. Television viewing port 29 is included for a closed-circuit television system that allows the user inside the module to visually monitor outside the module. Also included may be slow scan, still picture video transmission circuitry for security system enhancement, providing, upon a parent room intrusion, off-premise video identification of the intruder via telephone lines as described below.

Ventilation of the module is accomplished with intake port 30 and exhaust port 31 along with honeycomb waveguide air vents for RF shielding and automatically activated fans as described below. The purpose of having the intake vent port in the lower module case and the exhaust in the upper section is based on the principle of rising (body) heat; therefore, naturally assisting air movement inside the module and supporting more effective ventilation. UHF transmit antenna 32 and receiving antenna or photoelement 33 or security system remote control arming/disarming are also described below.

Figure 3:
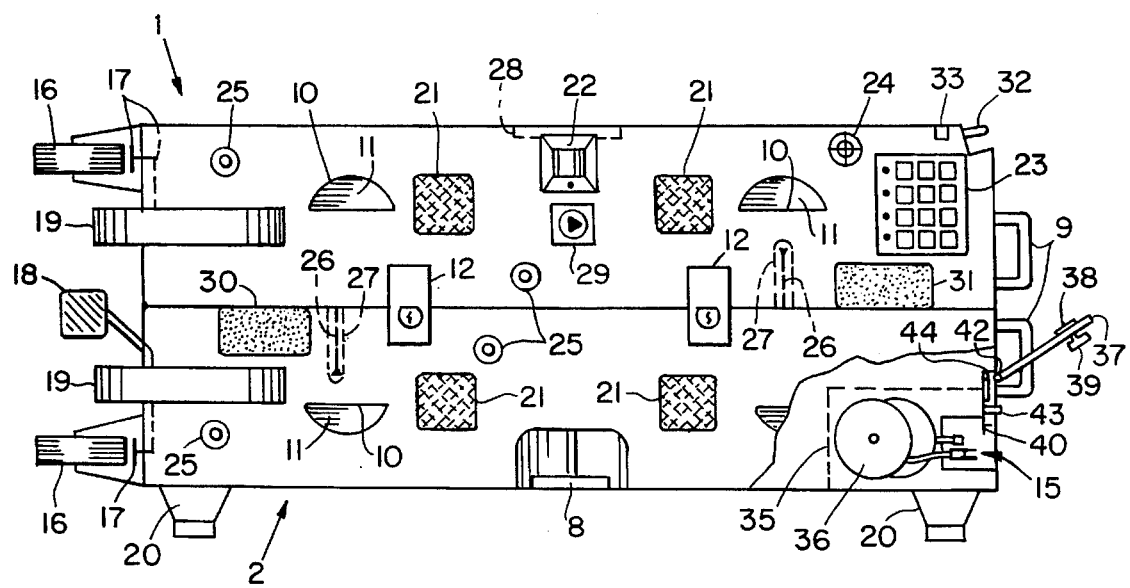
FIG. 3 is a side view, partially broken away, of the module of FIG. 1.
Figure 2:
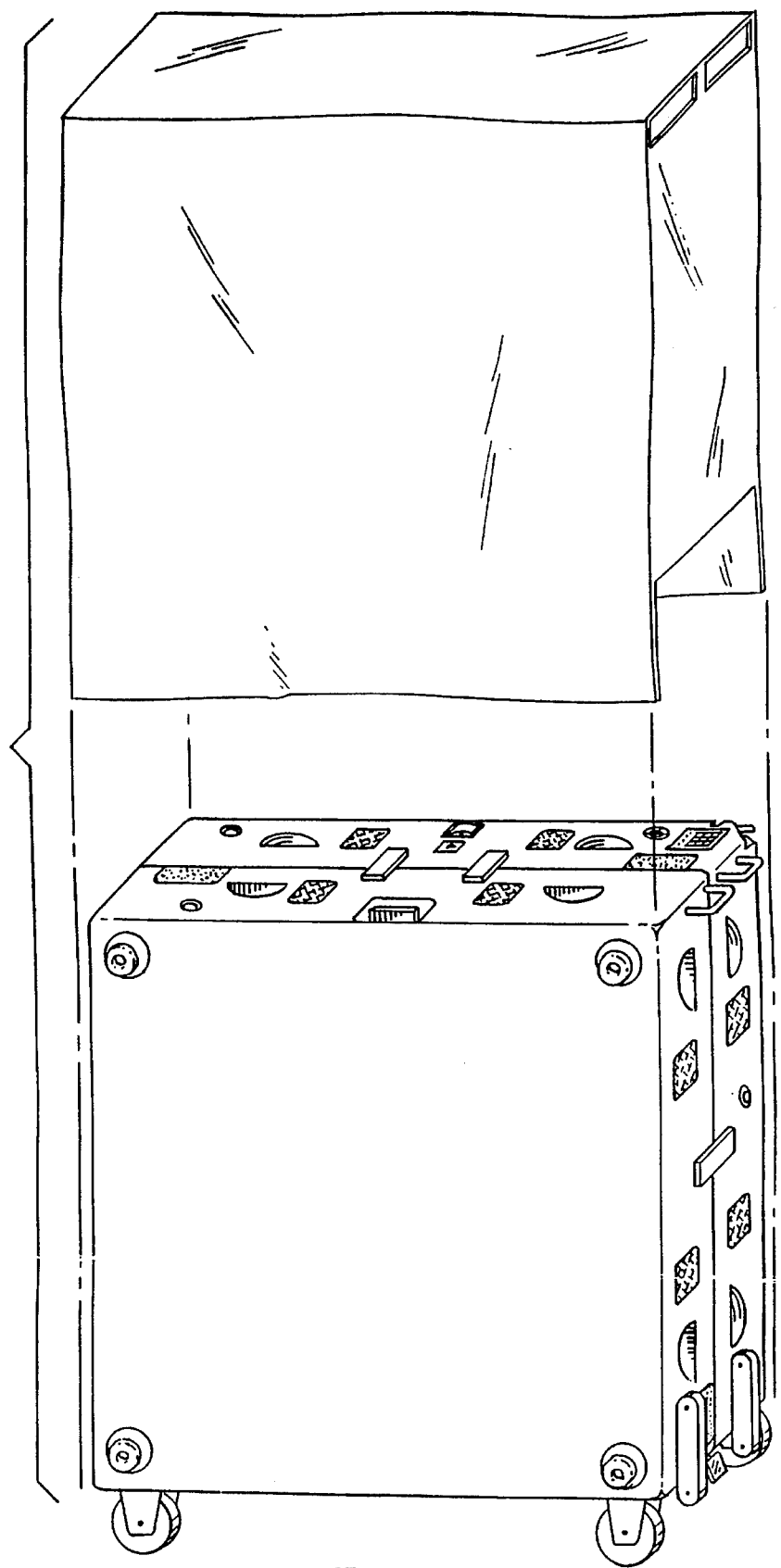
FIG. 2 is a view of the module of FIG. 1 with the module cover being placed thereon.

Shown in the partial cutaway view of FIG. 3 is spring powered, ratchet locking, power-return cable spool or spools 36 for carrying the power and telephone cables 15 so that they may be retracted and withdrawn from the module as desired. Area 35 is the termination point for the RF shielding that allows the cable to be carried outside of the RF shielded area so that the only penetration of the shielding is by the RFI/EMI filters which pass AC power and telephone information, at the penetration point, through the RF shield into the wire-spool area. A wide variety of RFI/EMI filters are readily available from specialty manufacturers such as Lindgren LectroLine (Los Angeles, Calif.). Hinged, cable access door 37 includes cam lock 38 with spring powered hinge 42 that holds access door 37 open. Tapered locking cam 39 for access door 37 is moved behind cam holding plate 40 to accomplish compression locking. Lock 38 may be a high security lock such as the unique angular-keyed locks sold by Medeco Security Locks, Inc. (Salem, Va.). Push button switch 43 may be included to open the security system standby power circuit when access door 37 is closed to prevent discharge of the rechargeable standby battery during periods of long distance transportation. To ensure security, a protective shunt circuit that prevents this pushbutton switch from operating during security armed periods may be included. The shunt would cycle open and closed as the security system is armed/disarmed, thereby shunting the push button switch in the armed mode. This process would eliminate the possibility of hostile, external control of the module power supply during periods of armed security as described in more detail below. Single-conductor quick-connect receptacle 44 may be included for an auxiliary grounding jumper to provide grounding of the RF shielding of the module when available AC power outlet does not provide a third prong for grounding. One end of the grounding jumper is fitted with a clamp suitable for attachment to a cold water pipe or other suitable ground.

Figure 4A:
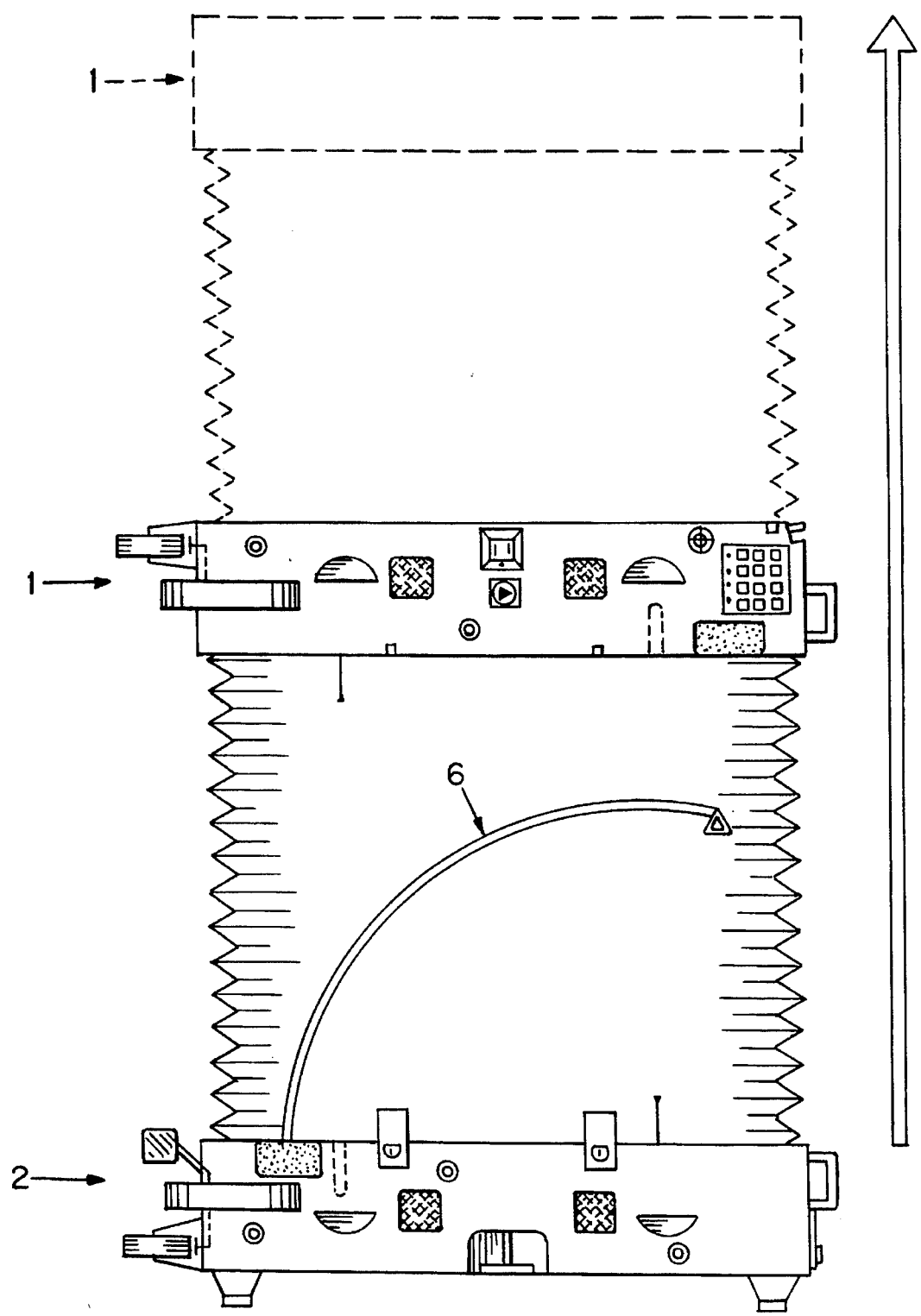
FIG. 4A is a front view of the module of FIG. 1 being opened.
Figure 4B:
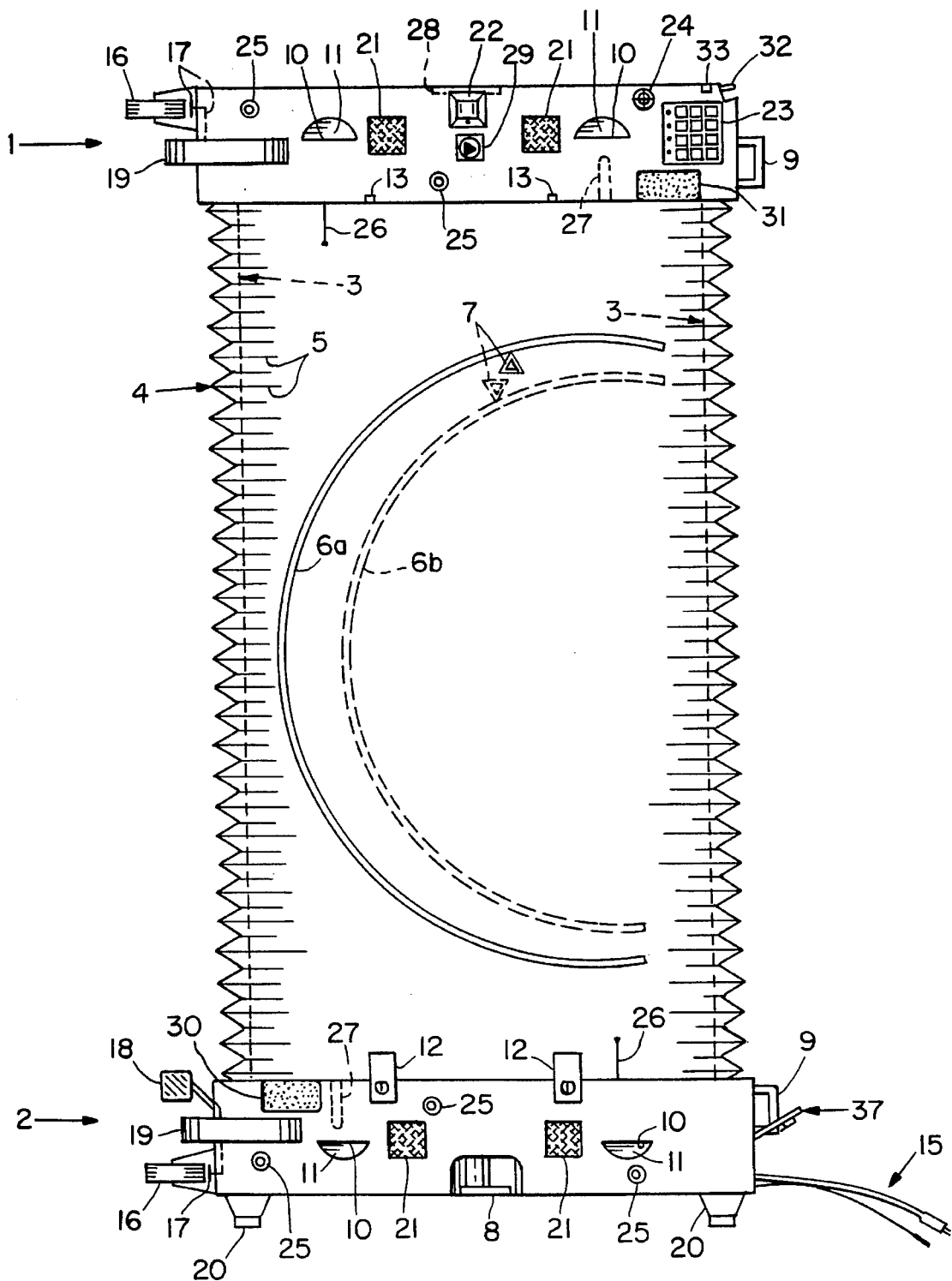
FIG. 4B is a front view of the module of FIG. 1 in the open position.
Figure 4C:
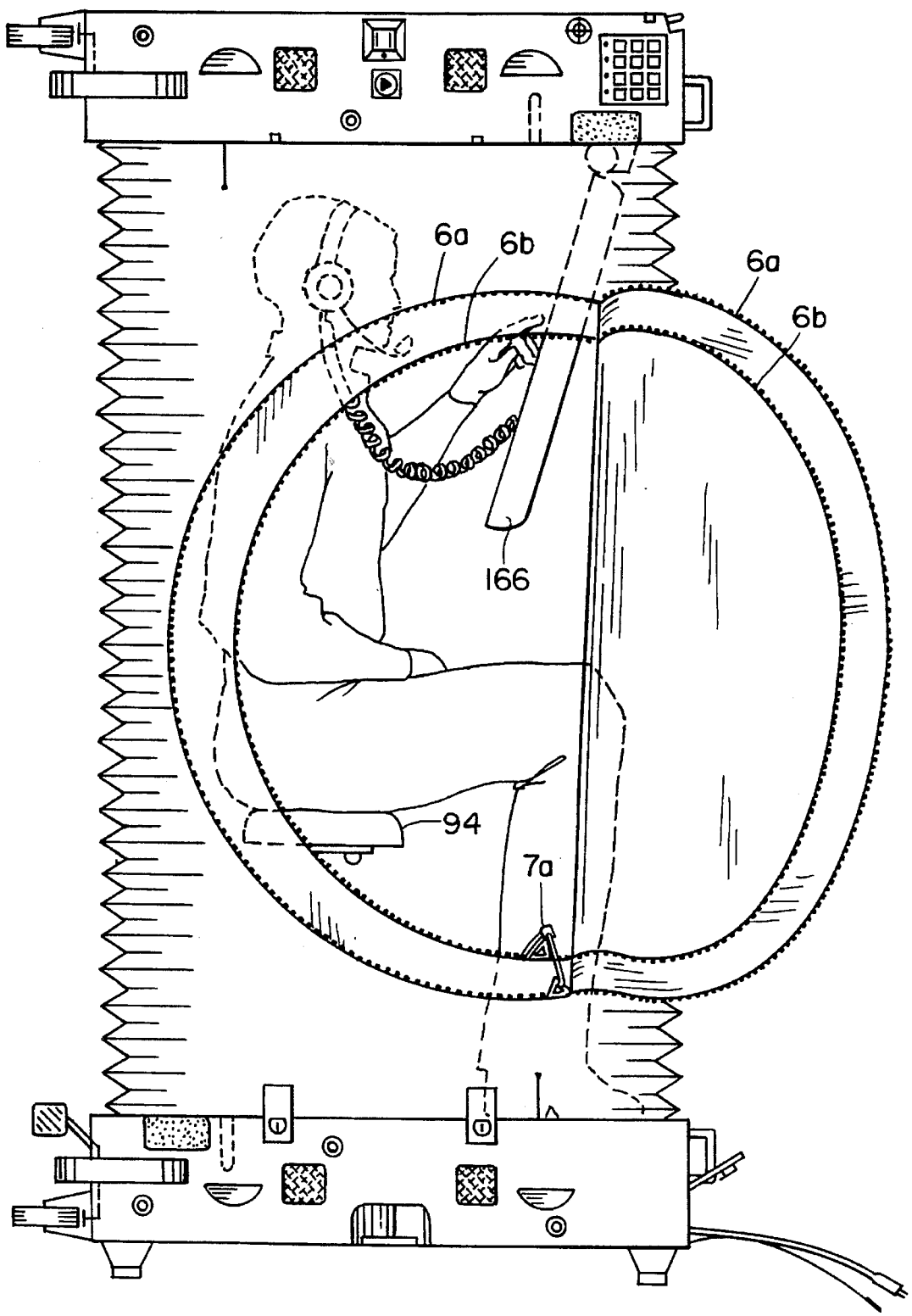
FIG. 4C is a similar view showing a person in the open module, with the zippered entrance flap open.

FIG. 4C shows the module open with the door flap open as accomplished by simultaneously opening zippered closures 6a and 6b. The two zippers are open and closed with dual zipper control handle 7a. A person is shown sitting on seat 94 using telephonic and other equipment on fold-down instrument cluster 166, both described in more detail below. When the module is open, seat 94 is offset to one side of the center of the module to allow room for the user's legs. When the module is collapsed, seat 94 moves down and to the right in FIG. 4C so that it is below the bottom portion of instrument cluster 166 to ensure that the seat contacts the instrument cluster as the module is collapsing to fold the instrument cluster into top module section 1 as shown in more detail below.

Figure 5A:
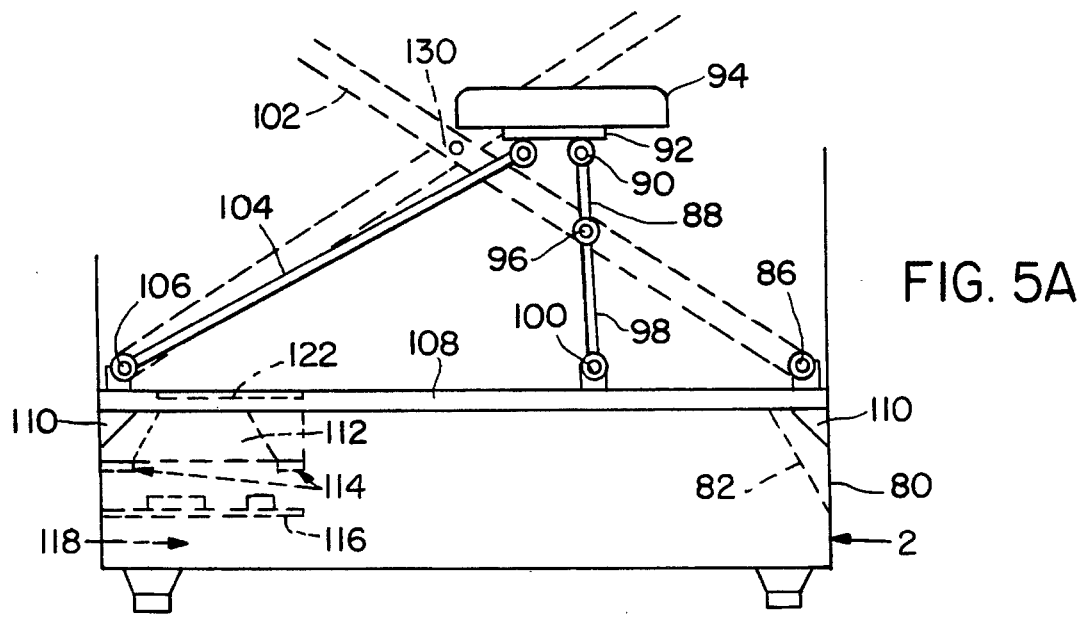
FIG. 5A is a schematic side elevational view of the automatic folding seat of the module of FIG. 1 in the upright position.
Figure 5B:
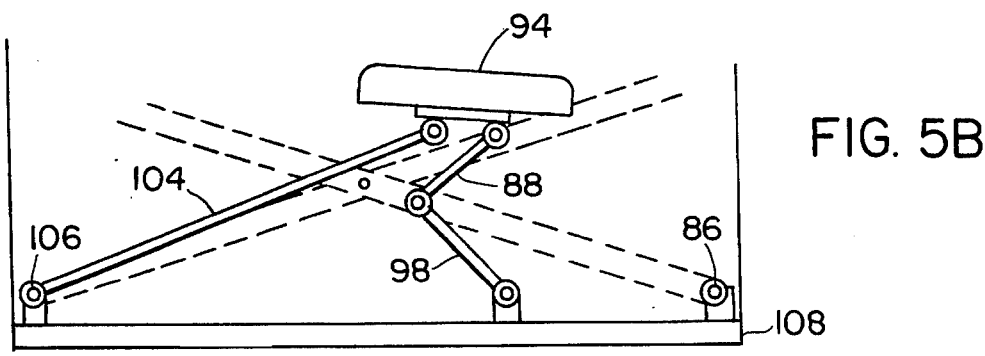
FIGS. 5B and 5C are views of the seat assembly of FIG. 5A in the partially collapsed and fully collapsed position, respectively.
Figure 5C:
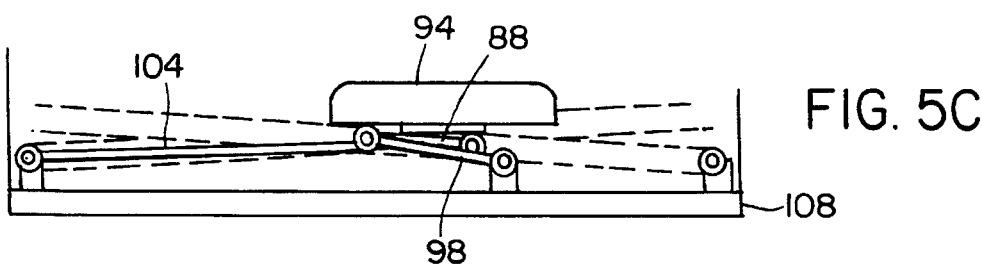
Figure 6A:
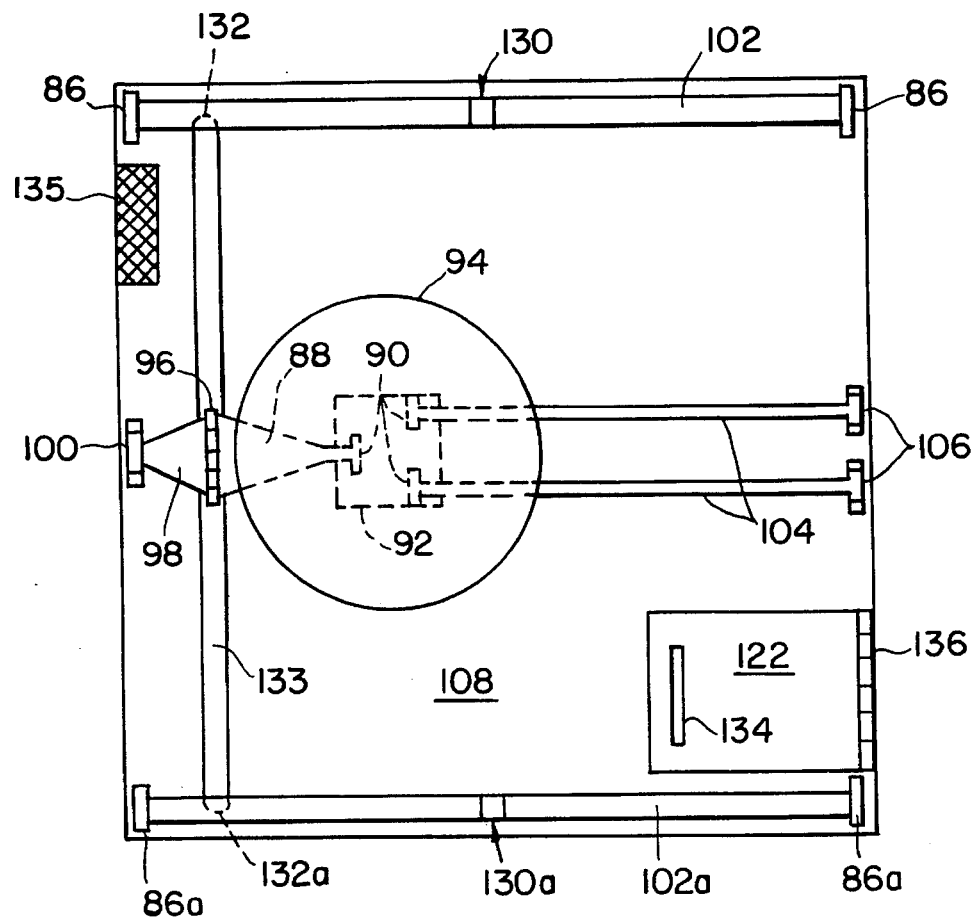
FIG. 6A is a top view of the assembly of FIG. 5A.
Figure 6B:
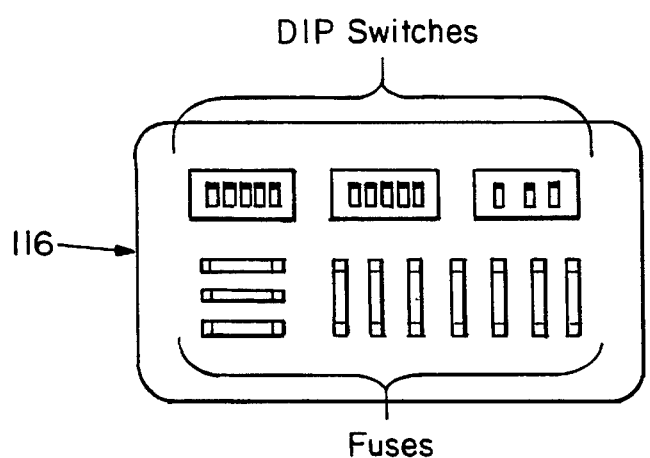
FIG. 6B is a view of the systems option-selecting dip switches and fuse board layout of FIG. 6A.

The internal, automatic rising/collapsing, pantograph-integrated user seat assembly is shown in FIGS. 5A through 5C and 6A. Pantograph arm 102 forms part of pantograph 130. Lowest pantograph arm pivot point 86 is within base section 2. In the top view of FIG. 6A second pantograph member 102a and pivot points 86a are also shown. The user seat comprises upholstered cushion 94 on support plate 92. A pressure-sensitive switch may be installed between plate 94 and cushion 92 to activate the ventilation system and interior lighting as the user sits in the seat. This feature is described in more detail below. Dual support rods 104 are hingedly attached to plate 92 at their upper ends and to reinforced floor plate 108 at their lower ends at pivots 106. Upper section of wide support rod/hinge 88 is hinged at points 90 and 96. Lower section of wide support rod/hinge 98 is hinged at points 96 and 100 so that the seat may be collapsed onto plate 108 as shown in FIGS. 5B and 5C. Floor plate 108 is suspended from base 2 by a number of floor plate supports 110 and may either be hinged on one side or completely removable to gain access to electronic equipment under the floor plate 118. Removable tote-tray 112 fits within a tote tray perimeter support 114. (Tote tray may be used to store foreign AC adaptors, grounding jumper and clamp, etc.) Hinged door 122 covers tray 112 and includes handle 134 and hinge 136 shown in FIG. 6A. A simple hinge spring or magnetic cabinet latch may be used to hold the door closed, important during the module transportation mode. The underside of the hinged door may be used to mount spare system fuses and a general purpose allen wrench held in place by spring-tension retainers for easy access. Circuit board 116, FIG. 6B, is mounted below tote tray perimeter support 114 as shown in FIGS. 5A and 6B and is accessible by removing the tote tray. The board includes a number of system fuses and DIP switches to allow the sales technician to set options available as described for the end user. Ventilation intake port baffle 82 directs air pulled in through intake port 80 up toward plate 108 which has intake port grill cover 135 therein for allowing air to pass into the module.

Seat 94 is operated as follows: Controlling rod 133 connects to pantograph members 132 and 132a and also to the hinged seat rod at point 96. When the pantograph is fully open, hinge 96 passes the 180° point (point 96 would be slightly to the right of where it is in FIG. 5A) to lock the seat mechanism in place along with the locked pantograph assembly, until the pantograph is collapsed. When the pantograph is collapsed, hinge 96 moves inward and downward along with the pantograph, allowing the seat to collapse as shown in FIGS. 5B and 5C.

The fold down instrument cluster for the module of this invention is shown in FIGS. 7A through 7C. Module top section 1 includes RF secure exhaust port 164 and airflow directing baffle 165 in a similar arrangement to the intake port described above. Instrument cluster 166 is hingedly mounted with a wide hinge at mount 172. An automatic on/off switch 170 activates overhead lamp 175 when cluster 166 is automatically lowered. Tempest sub-enclosure area for mounting electronic equipment 162 is shown in more detail below. Rigid head liner plate 163 is similar to the lower floor plate and carries mounting assembly 172. Rounded, smooth, seat contact area 173 contacts seat 94 to apply an upward force to cluster 166 when the module is collapsing, thereby allowing the gravity-operated cluster to fold up as shown in FIG. 7B and 7C. Hinge rest area 176 stabilizes cluster 166, when open, by it's own weight but may also include an internal spring-powered ball-and-notch type lock that releases under slight pressure as seat contact area 173 contacts the cluster when the module is collapsing. In either case, the cluster never reaches a 180° position. Thus, constant gravitational pressure is applied to hinge rest area 176 when the module is open for use and cluster 166 is never in a position that would preclude movement when contacted by seat 94. Ribbon wire or other flexible wires 174 carries the power and signals to and from the instrument cluster. User telephonic headset 178 includes volume-limited control knob 179, shown mounted on user's head. Wire 169 connects headset 178 to cluster 166 and headset 178 may be stored in cluster pocket 177 as shown on FIG. 7D. This pocket may contain a switching device to function as a hookswitch for the secure telephone, thus provide dial-tone automatically when the headset is removed. A cluster-mounted momentary-action pushbutton switch would be used to temporarily "hang up" and produce dial-tone again to make another call, etc. The headset should cover the user's ears entirely and provide light noise attenuation, for example, Telex Communications, Inc., (Minneapolis, Minn.) Model HS-700 with flexible boom mic. The purpose for this type of headset is to allow the user to hear more clearly in the presence of sound masking noise and to ensure that little or no sound escapes from headset speakers.

Cluster 166 includes clamps 177a, 177b for holding a pen and pad. Telephone and miscellaneous controls, TV monitor screen and TV-lens joystick control 181 are shown on FIG. 7D. Miscellaneous cluster controls and LCD display may be backlighted to ensure accurate viewing of the instrumentation.

FIGS. 7E through 7G disclose a preferred embodiment of a control circuit for the internal lamp 175 and intake and exhaust fans 606a and 606b. Overhead lamp switch 170, described above, activates timer 189 when the instrument cluster is lowered. Timer 189 turns on incandescent lamp 175 which may have a voltage rating of approximately 50% higher than the voltage supply to increase bulb life and provide softer interior lighting. Switch 185 is disposed within user seat 94 and is closed when the user's weight presses spring steel, switch control leaf 181 against switch 185. Leaf 181 is mounted to user seat base support plate 92 with mounting hardware 187 and is slightly curved to provide a space for switch 185. Timer 189 is enabled to shut off lamp 175 after a short time, for example three minutes, to allow the user to enter the module and sit on the seat. The circuitry lights the interior of the module as soon as it is opened so that the user does not have to enter the module in the dark, however, shuts off after three minutes to better support parent room security operations by not attracting attention to the module during armed security "away" periods. At any given time, when switch 185 is closed by the user sitting on the seat, seat switch timer control circuit 191 overrides, via a parallel connection, timer 189 to active lamp 175 and start both vent fans as well. When the user leaves the seat and switch 185 is opened, the timer in circuit 191 is activated for perhaps one minute. At the end of the time cycle both the ventilation fans and the light are automatically turned off and the module is once again standing by for use as a parent room security device.

The physical design of seat 94, cavity 183, and switch control leaf 181 is designed so that switch 185 is closed only by the amount of force created by the user sitting on seat 94 to prevent switch 185 from being activated when the module is closed as shown in FIG. 7C.

FIGS. 8A and 8B show the base and top section RF liners and tempest sub-enclosures for preventing the passage of electro-magnetic and RF emissions from onboard electronic equipment into the parent room. Module top section 1 and base section 2 each carry a number of tempest sub-enclosures 203 formed by metallic compartment dividers 204 within a metallic-lined, or molded metallic case-section 205. Interior head liner 206 encloses sub-enclosures 203. The internal RF liner 208 lines the entire top and base sections. The tempest enclosures and the RF liners are attached to ground 209. Metallic, ventilation baffle 210 in upper section 1 and baffle 210a in lower section 2 direct air flow into and out of the module. Baffle plates may serve as tempest sub-enclosure wall components as well. Also shown in FIG. 8B is wire spool compartment 212. Module floor insulators 213 are shown in FIG. 8A. Areas 206 and 207 may be covered with thin, adhesive-backed, lightweight carpeting to absorb sound within the enclosure, thereby attenuating sound escaping into the parent room and providing more effective audio security. Tempest sub-enclosures and module case-sections may be manufactured to specification by specialty fabrication companies such as Electromet Corporation (Hagerstown, Md.). Rather than utilizing tempest sub-enclosures, another method would include custom designed RFI/EMI shielded electronic subassemblies manufactured by specialty companies such as Caron Enterprises, Inc. (Girard, Pa.).

FIGS. 9A through 9D schematically depict the pantograph-type frame of the module of this invention that in combination with the top and base member form the mechanical structure portion of the collapsible and expandable portable module of this invention. The general structure of the pantograph 250 is shown in FIG. 9A. The pantograph locking mechanism that locks the member in the upright position is shown in area 254 that is detailed in FIG. 9D. As shown in FIG. 9B, the pantograph comprises a number of pivotably interconnected structural cross-members such as members 256 and 258 interconnected at point 259. In one embodiment, springs such as spring 260 that is connected to member 258 and point 259 may be included to assist module opening. Slow-air-release piston or pistons 261 control the rate of descent when the pantograph is released from the open and locked position, similar to units used to control spring-powered doors, such as a screen door on a house. Operation is as follows: pantograph springs would assist opening to approximately the half-way open position and pistons would control descent to the half-way closed position. When closing, the user would step on the release pedal, wait for the unit to descend to and stop at the half-way position, then gently push down on the top case-section, compressing pantograph springs 260, to close and lock the module.

FIG. 9C is a cross-sectional view taken along line E—E, FIG. 9A. This figure details the pantograph locking mechanism with external foot pedal release. Shown are lower pantograph members 272 and 274 interconnected to guide bars 282a and 282b, respectively. These guide bars ride in slots through the base section of the module, one such slot shown in FIG. 9A. Top slots 252 shown in FIG. 9A allow upper guide bars freedom to travel, however, are not part of the pantograph locking mechanism.

The locking and release mechanism are shown in more detail in FIG. 9D. Release foot pedal 279 extends externally from the module base section 2. Lift bar 278 is attached to locking fingers 280a and 280b. Locking finger 280a is shown in detail and pivots on point 290. Spring 292 urges the finger to return to the locked position shown in FIG. 9D wherein the finger is engaged in stop block 286 that prevents member 282b from sliding into slot 254 as is required in order for the pantograph to collapse. Pedal return spring 294 urges the pedal to return to the locking position shown in FIG. 9D.

To close the assembly, the operator steps on pedal 279 to release the locking fingers from the stop blocks, allowing guide bars 282a and 282b to slide along the slots as the pantograph collapses. The mechanism is shown in its open, locked position, FIG. 9D, in which bar 282b cannot slide along slot 254. In the closed position bar 282b would be at the far right end of slot 254. As the pantograph is expanded bar 282b engages the lower curved surface 281 of arm 280a to lift arm 280a so that bar 282b can travel to the far left end as shown in FIG. 9D. Spring 292 then returns finger 280a to its locking position shown in FIG. 9D to keep the pantograph assembly in its raised position. Depressing the external pedal 279 then lifts both locking fingers simultaneously via the attached lift bar to allow the pantograph arm ends such as end 282b to travel back along the slots so that the assembly can collapse and the module can close. The pantograph assembly for the module may be constructed of high strength, lightweight material, such as aircraft quality aluminum.

FIG. 10 is a block diagram of an automatic shunt circuit for power supply cutoff switch 43, as shown in FIG. 3, that may be arranged to open the security system standby power circuit when door 37, FIG. 3, is closed, to prevent deep discharge of the rechargeable standby battery during long-distance transportation. The protective shunt circuit prevents switch 43 from operating during security armed periods to eliminate the possibility of hostile, external control of the module power supply during periods of armed security. System 320 includes security system control instrument/panel 321, described below. LED 322 is lit when control instrument 321 is armed either using a module-mounted keypad control or a wireless remote transmitter control. Transistor-operated relay circuit 323, such as Aritech Corporation (Hickory, N.C.) MPI-206 series, draws a small amount of current from LED circuit 322 and is activated closed when LED 322 is activated, thereby shunting switch 43 with contacts rated 5 amps at 28 VDC. Battery 325, which may be a rechargeable cell or cells such as Gates Energy Products (Gainesville, Fla.), Monobloc sealed-lead batteries, powers the unit. Floating charge circuit 326 is a circuit that samples an attached battery, adds power to charge the battery when needed, and holds back from overcharging when the battery has been charged to the required specification. Floating charge circuits are usually integrated into control instruments such as instrument 321. Block 327 indicates standby-power-dependent on-board electronic systems connected to power supply/charge circuit 326 that are protected by the shunt circuit.

A second part of the security system, a security system automatic loop selection circuit, is shown in FIG. 11. This circuit may accomplish automatic selection of the proper security system detection circuit by including a permanent magnet 330 in the module top section and magnetic-responsive, detection loop selecting contacts 332 in the base section that are switched between loop A and loop B depending upon whether the module is open or closed. Loop A is used for protection of the module during closed storage; loop B is automatically selected when the module is open, for protection of the unattended parent room in which the module is located, using the multi-element wide angle, passive infrared detector 22 as shown in FIG. 4B. Loop A includes photosensitive detectors 336 for detecting light when the module is stored in a dark storage area, and vibration analyzer 338, that detects vibrations such as those from shock and drilling, and in response triggers an alarm. Analyzer 338 may have an event counting processor such as a Litton Poly-Scientific (Blacksburg, Va.) Terminus Pad-A-Dap one-zone processor, Model No. SP3219-1 with 1 or 2 Model No. SP3237 shock sensors; Litton sensors may also be positioned to detect tipping of the module. Such systems are programmable to ignore a limited number of shock events in order to prevent a false alarm. However, events are stored for a period of time, and exceeding a particular number of events in a given time-frame initiates an alarm. Cabinet contact switches 340 will trigger an alarm if the module is unlocked and opened (point contacts) during periods of armed security. Detectors 336, 338, 340 may be independently selected, or selected in groups, by the user via the security system keypad shunt control feature operating in conjunction with zone-controlling central instrument 321.

FIGS. 12A and 12B are side and top schematic views, respectively, of typical passive infrared sensor (PIR) detection patterns such as those models specified for use with the invention. PIR 22 in top section 350 senses minute thermal changes throughout detection zones 360 through 364 on 3 planes; 356, 358 and 360 as shown in FIG. 12A. These thermal changes are recognized as an intruder's motion within the parent room and in response trigger an alarm output, via the PIR relay contacts, thus switching the security system central control instrument to initiate an off-premise notification via the switched telephone network. Notification of an alarm condition may be in the form of a digital alarm signal or a freeze-frame video of the parent room sent via the on-board slow scan transmission system of the invention described below.

FIG. 13A shows the module 350 closed and in a dark storage area in which it is accessible to AC power 382 and optional telephone network connection 380; a telephone line is not required for off-premise notification if the module wireless notification system is utilized as described below. 384 shown in FIG. 13B is the module ground jumper connection and is only required if AC outlet 382 does not provide a ground. The dark storage photo-sensitive system utilizes surface-mounted sensor elements connected to a signal amplifier with a relay output that activates the security system central control instrument described above. Photo-sensing elements are redundant, and spaced at a number of locations on the module cabinet(s) exterior, smoothly flush mounted to preclude a person from identifying sensor element locations in the dark and then covering the elements with a substance such as clay prior to illuminating the dark storage area. The photo-sensors respond to both white light and infrared light as generated from infrared night vision illuminator units available on the market. This system will provide, in a dark storage area, an extremely high level of detection sensitivity with an absolute minimum of false alarm probability, and does not require installing equipment in the storage area other than an AC outlet and a "peel and stick" light-sealing rubber gasket for the storage room door. The storage room may be a typical clothing closet in an office or a house. Threshold sensitivity settings for surface-mounted photo sensors may be selected, in increments, with system DIP switches shown above in FIG. 6B. Other detection options may be selected by the user when the module cannot be placed in dark storage with the use of the user keypad shunt control shown in FIG. 11. Selections may be verified for the user with an LED display. Entry/exit delay settings for the security system allow the user a predetermined time period to leave and approach an armed module without causing an alarm output. A sounder, such as a Mallory Sonalert, shown in FIG. 4B as number 24, may be utilized to warn the user that entry delay circuitry has been activated and an alarm is imminent. A short tone from the sounder may also verify when the security system is armed or disarmed via the key-chain-size, remote wireless arming/disarming device as stated above, for example, one beep equals armed, two beeps equals disarmed. Entry/exit delay circuitry is integrated into the central control instrument and may be adjusted, in increments, using DIP switches described above.

The transmitting and receiving signalling antenna system of the module of this invention is shown in FIGS. 14A, 14B, 14C and 15. With the module in the closed configuration shown in FIG. 14A, RF-leak-test receive antennas 401 and 402, that are mounted on the top and/or base members outside of the flexible RF barrier, are received within receiving cavities in the mating module portion to protect antennas during the transportation mode of the module. Receiving cavities 403 and 404 are shown in FIG. 14B. When the module is opened, as shown schematically in FIG. 14B, these antennae are exposed and are outside the RF enclosure and thus may be used to test whether there is RF leakage from the unit by transmitting from internal RF leak test transmit antenna 405 that is mounted inside of the flexible RF barrier. Test signals may be a suitable UHF frequency. A simple red light/green light display may be provided for the user inside the module to verify RF shield integrity, and an RF barrier test cycle may be initiated automatically each time the module secure-voice telephone is activated for use by utilizing the telephone hookswitch control function to activate the RF barrier-test circuitry. The hookswitch may be located on the instrument cluster as described above.

FIG. 14C shows UHF flexible stub antenna 408 for signalling to a remote pager as described below. IR receiving element 407 for the wireless key-chain-size transmitter is also described above. An IR key-chain-size transmitter is preferable for security because IR will not penetrate parent room walls. However, if an RF device is utilized, one antenna may be used in conjunction with a diplexer to receive wireless commands and transmit to a pager as well. Antenna 408 may be covered with a rubber covering that also encapsulates an internal lacing of small diameter wire connected via isolation circuitry to the security system tamper protection loop so that if the lacing wire is severed an alarm event will be triggered and registered in memory as described below. An indirect connection utilizing a relay and/or RF filtering is important to preclude RFI from affecting the module security system via the tamper protection circuit during UHF transmission from antenna 408. Typical personal receivers for digital alarm signals transmitted over antenna 408 may be a pager 413 with AC charger 414, and/or a receiver system 410 that may be carried concealed in brief case 412. During parent room "away" video surveillance described below, the pager system would notify the user of an unauthorized intrusion in progress. Signals may also be transmitted to professional facilities such as central monitoring stations, guard booths, etc.

Signal antenna 408 may be an automatic extend/retract antenna 440 as shown in FIG. 15. Security system central control instrument 321 activates upon alarm, and includes auxiliary timing circuit 434, for example, Altronix (Brooklyn, N.Y.) model 6060 timer, which controls the RF transmit and extend antenna time. RF signal transmitter 436 is connected by a coaxial cable 438 to antenna 440 that is extendable and retractable within power antenna body 437 that has antenna movement-limiting microswitches 439 and 439a. The transmit frequency range and modulation type for either antenna system stated above may be coded UHF or other suitable frequency range. Operation of the system is described below. Antenna 440 may also be a cellular telephone antenna if the module is so equipped and may transmit digital alarm data or slow scan video pictures during an alarm cycle.

FIGS. 16A through 16C detail an on-board closed circuit video system for the module of this invention that permits the user to monitor areas outside of the unit during a secure communications session, (for example the user may wish to know that a secretary or associate has entered the room) as well as allow security system (PIR) activated, remote twenty-four hour surveillance of the parent room area outside the module of this invention. CCD (charge-coupled device) video camera 451 such as a Pulnix America, Inc., (Sunnyvale, Calif.) Model TM-34K-0 has its output provided to panel-mounted television monitor 452, for example, Sony Security Systems (Montvale, N.J.) FDM-030 flat display monitor that has a screen size of 2.0×2.7 inches. The TM-34K camera would provide quality video in low-light areas and infrared lighted areas as well. Parallel camera output 452a is routed to slow scan equipment as described below. Monitor 452 may be mounted in the fold-down instrument cluster 453. Four position mini-joystick controller 454 is used to position the camera lens as described below.

Flexible, fiber optic lens 457 such as units sold by Visual Methods, Inc., (Westwood, N.J.) is connected to camera 451 by mini-bayonet mount 456. Fiber lens 457 passes through a grounded waveguide 458 that is mounted to the module top section 1 by RF-sealing mount 459. The waveguide prevents RF leaks from the module and prevents revealing emissions from the video camera that could be detected by hostile surveillance equipment, thereby alerting adversaries that the parent room is under active video surveillance and interfere with intruder-ID "surprise" parent-room video operations. It is also possible, in some cases, to decipher parent room images from intercepted video camera emissions. Hole 460 through top section 1 provides an open area for the camera lens and the lens steering components that allow the operator to change the camera view. Lens steering motor control assembly 462 responds to commands from joystick 454. Rigid lens steering collar 464 is connected to motor control assembly 462 by control linkage 463. 465 is the lens assembly termination point. The lens assembly may incorporate an auto iris mechanism to provide quality images under a variety of lighting conditions. Steering-collar rubber suspension mount 466 is the flexible component that permits lens movement. High-impact plastic protective lens cover 467 may be convex or flat.

FIG. 17 shows in block diagram a slow scan, still picture video transmission system utilized in conjunction with the system shown in FIGS. 16A through 16C. This system provides the user with remote video alarm transmissions of the module parent room using the switched public telephone network. The system may be activated upon detection of an intruder to transmit video freeze-frames to any remote location at which the images may be viewed in near real-time on a TV monitor, and/or recorded on a VCR or thermal paper printer automatically activated by each alarm event. Freeze-frame videos would be sent approximately every two seconds during an intrusion. Programming of the slow scan transmission system digital telephone dialer with the desired outgoing telephone number may be accomplished with the on-board DTMF (dual-tone multi-frequency) telephone keypad utilizing a DTMF function-transfer switch as described below, and/or a remote-access DTMF-responsive, control device with EEPROM memory 511, which would enable the user to change the digital dialer video-send telephone number from any external location.

The slow scan television transmission system is activated upon a parent room intrusion by the security system passive infrared detector 22 as described above and security system central control instrument 321 that sends a signal to digital telephone dialer/transmitter 502 during an alarm event. CCD video camera 451, also shown in FIG. 16A includes a 75Ω mini-coaxial cable 512 to the internal video monitor shown above. A parallel output 452a, also shown in FIG. 16A is also provided to signal processor/transmitter 502, for example, a Sony Security Systems (Montvale, N.J.) SPT-T200 Telepix transmitter with automatic digital telephone dialer that provides the digital freeze-frame data and which transmits the images via the telephone lines to the external location where the signals are received with a slow scan video receiver/monitor such as a Sony SPT-R200. The Sony system is a good example because it is event-triggered and provides for transmission of parent room audio as well utilizing "listen-in" microphone or microphones 514.

DTMF keypad and LCD numerical display 504 allows the user to select the outgoing video-send telephone number in conjunction with DTMF function selector 505 and view the information on the LCD display for verification before sending it to an EEPROM circuit where the data is retained for use with the slow scan transmitter/dialer. Secure-voice communications encryption equipment 506 utilizes DTMF pad 504 in conjunction with selector 505. An alternative to the DTMF function selector would be to utilize two DTMF pads. The public telephone network is indicated by block 507. The freeze-frames are provided to television receiver/processor 508 at a remote location, as well as auxiliary VCR or video printer 509. A remote touchtone (DTMF) telephone 510 allows the user to access the DTMF remote-control circuit 511 described above and remotely control programming of this system.

FIGS. 18A through 18E devil the flexible module covering and RF shielding for the module of this invention, including one means of allowing user access to the interior of the module while still maintaining a quality RF seal that meets or exceeds the frequency and attenuation specifications stated above. Flexible, opaque, RF-shielding module liner 521, FIG. 18A, includes three basic components: metallic fabric for RF shielding 523 as described above, protective inner layer 523a (prevents accidental damage to the metallic fabric), and permanently creased, fold-guiding, protective outer layer 525 which may be a thin rubber layer capable of "remembering" crease locations for proper, consistent folding of the flexible barrier. Module base component 2 is lined all around with RF liner 530 (or the entire case section may be constructed of metal) to which metallic liner 523 is electrically connected using a pressure component 533 and evenly spaced, continuous screw or rivet fasteners 533a. Said pressure component and fasteners secure the RF liner into formed area 532 in base component 2. Liner 523 is exposed to liner 530 by making external protective layer 525 end before it reaches electrical contact area 532. Metallic fabric and protective inner layer 523/523a is continued past the contact area to ensure a resistance-free electrical connection and to firmly hold the barrier in place. Liner 523/523a terminates at point 531. Pressure component 533 has a top clamping area 534 that is intended to firmly hold all flexible layers in place and to protect metallic fabric layer 523 from being pulled as the module is opening. The top case section of the module utilizes the same mounting arrangement for the flexible barrier as the base section.

Precision, close tolerance metallic zippers 526 and 526a, FIG. 18B, close user entryway 522, shown open. The zippers are firmly sewn to the nylon, metallic coated fabric with the zipper metal in continuous contact with the metallic fabric to provide continuous electrical continuity across the entire face of the module that contains the user entryway. In the area where the zippers are sewn, but not in the electrical contact area, all layers of the flexible barrier are also sewn together and appear as a single, flexible barrier 521. The module zipper system can easily be maintained for high performance by occasionally cleaning the zippers with aerosol spray electrical contact cleaner available from any Radio Shack or similar type store. On the interior side of the flexible barrier, a section of metallic fabric material overlaps the primary section of metallic fabric forming a secondary flap 524 that closes with flap zipper 527a. The section of the barrier where the metallic fabric is redundant to create a flap, may be a dual metallic fabric layer manufactured by special order, or a second section of flap material may be sewn to the original layer of metallic fabric then soldered or taped with specialized metallic fabric shielding tape as appropriate to maintain resistance-free electrical continuity. Unique metallized-fabric adhesive tapes such as copper and silver/copper on a rip-stop nylon substrate are currently available and manufactured via a corporate agreement between Adhesives Research, Inc. and the Monsanto Company Chemical Group. The entire metallic fabric RF shield 523 may be two layers for purposes of forming the second zipper flap and this will contribute somewhat to the overall attenuation rating of the module RF shielding performance as well. Zipper pull 527 operates flap zipper 526 and zipper pull 527a operates the primary barrier zipper 526a. The RF metallic barrier is shown grounded via internal module wiring 528 shown in more detail below. The density of opaque layers 523a and 525 is commensurate with the degree of protection desired for preventing IR passage.

Pull handles that may be used to operate both zippers are shown in FIGS. 18C and 18D. Both views are from a perspective inside the module. RF shielded flap 550 between zippers 558 and 542 may be connected to inner zipper 542 and not outer zipper 558. However, the flap does pass over outer zipper 558 when closed and the RF lining is continuous with lining material on the 523a side of FIG. 18C as a second layer. When closed, the user entryway is RF leak protected with two metallic fabric layers and two zippers that are arranged in offset positions.

FIGS. 18C and 18D are zipper pull arrangements with rigid pulls. These pulls use a rigid handle 552 attached directly to the interior zipper pull 554. The exterior zipper pull is connected to the handle with a fine but rigid wire such as a spring steel wire so that the handle can be pulled to close the zippers and pushed to open the zippers. In FIG. 18C, flap guide support bar 556 is attached to pull handle 552 to help guide RF seal flap 550 into the proper position as the zippers are closed to prevent jamming of interior zipper 542. The flexible barrier flap 550 is positioned between support bar 556 and rigid control wire 546. Outer zipper 558 would not be visible when flap 550 is closed. FIG. 18D shows a similar arrangement without a flap guide bar. The outer zipper pull for zipper 558 may be utilized to operate both zippers from outside the module to close the entryway prior to collapsing the unit to ensure proper barrier folding as the module is collapsing. Custom, industrial sewing projects, such as the assembly of flexible materials and conductive zippers that comprise the module folding barrier, may be subcontracted to specialty firms, such as SeamCraft, Inc. (Chicago, Ill.).

FIG. 19 is an internal view of a section of the module showing module top section 1, base section 2, and flexible RF barrier covering 567. Internal white noise transducers 563 are mounted at spaced locations on top section 1 and base section 2 to vibrate the sections in order to interfere with laser eavesdropping systems monitoring the module remotely. Flat, rigid, lightweight resonating bars 565 are mounted at spaced points to the interior of flexible covering 567 and are interconnected with ribbon wire 566 to provide power to white noise transducers 563 that similarly vibrate the flexible RF covering to also prevent laser intercept from outside the module. Resonating bars help distribute masking frequencies evenly and are attached with adhesive to the protective inner-layer of the three-layer RF barrier and do not affect performance of the barrier. The white noise system will also contribute somewhat to the masking of user voice audio leakage into the parent room.

Parent room masking speaker 568, FIG. 20, is shown in more detail mounted to module top or base section 569. Internal metallic RF liner 570 covers the back of speaker 568. Speaker wire 571 penetrates the RF barrier through an individual RFI/EMI filter 571a for each speaker so that RF energy cannot follow wire paths and escape from the module. Tightly woven metallic grill 572 covers the speaker and further prevents EMI leakage through the opening in section 569. Grounding straps 573 for speaker grill 572 electrically connect grill 572 to liner 570 and would not apply if metal case sections are used. Security system tamper switches 580 and 581 may be momentary hold, push-to-close switches held in position by the speaker grills 572. During periods of armed security, an attempt to remove the speaker grills, or any other surface-mounted item protected with similar switches, would result in an alarm event. The closed-circuit tamper loop is independent of entry/exit delay circuits described above and responds instantly. Preferably, surface mounted equipment on the module would be fastened internally utilizing threaded, welded posts on each surface item mounted, thereby providing no removable fasteners on the exterior surface of the module.

FIG. 21A shows in cross section an RF secure ventilation intake port for the module of this invention. Boxer fan 606 includes fan hub 607 and fan blade 605 attached thereto. Opening 614 in module top section 1 allows air flow and is protected from allowing any RF leakage with a honeycomb waveguide air vent 608 that prevents passage of RF energy of up to 1 GHz at the minimum. A range of honeycomb waveguide vents with varied performance specifications are available from specialty manufacturers such as Instrument Specialties (Delaware Water Gap, Pa.). Fan 606 and waveguide vent 608 are held in place in U-shaped channel-frame member 618 as shown in the exploded view of FIG. 21B. Once fan 606 and waveguide 608 are placed in frame 618, frame top member 62 1 is secured to provide a tight fitting frame that is preferably lined with an RF sealing mesh gasketing such as the many types available for RFI/EMI shielding purposes from Instrument Specialties Co. as stated above to preclude RF leakage. Exterior rigid metallic grill 616 is secured to top section 1 with retainers 612 that also provide grounding via attachment to the frame 618. The grounding takes place through internal RF liner 610.

Interior grill 135, FIG. 21C, allows air passage into the module through the floor plate, and also provides service access to fan 606 and honeycomb waveguide vent 608 from inside the module for occasional vent cleaning or replacement of the boxer fan unit. Metal baffle 619 directs airflow up from fan 606 through grill 135 into the module. The exhaust fan would have the same arrangement with the airflow reversed. Interior grill 135, as it relates to the module interior floor plate, is shown in FIG. 6A above.

FIG. 21D is an overall view of the module with both ventilation fans in operation. The arrows indicate airflow direction as air enters into the base case section and exhausts through the top case section.

The electrical schematic diagram implementing all of the above functions is shown in FIGS. 22A through 22C. The power enters the module through RFI/EMI line filter 734 and voltage selecting relay 740 which may be a switchable relay to select the proper input voltage. Included is over-voltage protection circuit 741 which prevents damage to the electronic components in the module which may be caused by voltage spikes; such units are manufactured by Polyphaser Corporation (Minden, Nev.). Transformer 744 and rectifier/filter 746 provide the necessary power to the distribution instrumentation and controls indicated by block 720. Block 710 is RF leak test system as described in detail above.

White noise masking sound generating transducers 702 are mounted so that they transmit white noise, or a variation thereof, from generator 704 for example, a Research Electronics, Inc., (Cookville, Tenn.) Model No. ANG-2000 acoustic noise generator to transmit noise into the module. The white noise volume is controlled by user-limited intensity control 706 so that the white noise volume cannot be turned off but, to ensure security, may only be lowered by the user during secure communications. AC power 732 may be carried by RFI/EMI filter 734 that penetrates the module RF barrier but does not allow RF leakage.

An optional strobe light 724 may be mounted accessible to the outside of the module to signal for example when the module is in use. The strobe light is recessed in a mirrored bowl 724a and covered flush with conductive, grounded, wire-reinforced glass 726.

Voice activated relay 772 is responsive to voice sensing microphone 770 for activating the primary masking noise amplifier output. Automatic masking amplifier volume control is accomplished in conjunction with the user's voice so that the output volume of babel-type masking sounds is directly proportional but higher in volume to that volume of audio created by the user speaking into telephone equipment using circuit 768, 766 and 760 in conjunction with player or generator 764. Module babel speakers 784 may be controlled by an amplifier output control in 760 that randomly alternates speaker to source information. This methodology will prevent the system from generating the same sounds from the same speakers each time prerecorded material repeat-plays. It is critical that the primary masking volume is always higher than the voice audio leakage from the module as the user is speaking to ensure security. When speaking inside the module on telephonic equipment the user is positioned directly in the center of an omnidirectional array of noise projection speakers on upper and lower elevations of the module. The primary masking system is only active as the user is speaking, thus providing easier listening during a secure telecommunication session. Quick-connect jumper ground cable 788 may be stored in tote-tray 782 under door 780, as shown in detail in FIG. 5A, for connecting the grounded components, particularly the RF shielding means 730, to cold water pipe or similar ground 792 through module connector 786 and tooth-jaw, spring powered, pipe clamp 790. 792 is a typical cold water pipe. This jumper cable is provided as a back-up device as described above.

Encoder/decoder 748 is the secure remote telephone communication device for this invention as described above. The output is provided to the telephone network through an RFI/EMI filter 802 that allows telephone conductors to penetrate the RF barrier without RF leakage. The telephone device also contains a relay to fully break electrical contact with the telephone network each time a telephone conversation is terminated and the device is inactive. Finally, the telephone device should be able to interface with DTMF and rotary-dial networks.

Security system central control instrument 321, powered by DC uninterruptable, rechargeable power supply 810, may be communicated with remotely using user remote wireless transmitter 818 and receiver 816 for accomplishing external control of the system. As a protective measure, the wireless feature may be selected or deleted by the user with the digital keypad control/shunt selector. Magnetic contacts 826, vibration analyzer 824 and photo-sensitive system 822 are all alarm sensors that may be selected for use with the user keypad control 814 as shown in FIG. 11. For maximum security, the security system keypad may be a Hirsch Electronics Corporation (Irvine, Calif.) Scramble Pad Model No. DS37L "Spy*Proof" used in conjunction with the circuit board contained in Hirsch Control Instrument No. SL1. This system rearranges temporarily lighted digits each time the pad is used, thereby preventing onlookers from memorizing keypad fingerbutton locations when a code is inserted. The Hirsch unit also restricts the viewing field of the lighted display to 2°, and the user must be directly in front of the pad to read the numbers. All alarm condition is transmitted over the telephone lines with digital communicator 804 as an alarm signal or as slow scan video data from slow scan system 808 and also may be indicated with optional local range wireless transmitter 806. 800 is a telephone line-cut monitor, such as an Ademco (Syosset, N.Y.) Model No. 659EN, for monitoring the telephone line during periods of armed security. The line-cut monitor constantly samples telco line voltage and should telephone service to the module be interrupted for a specific time period (approximately 30 seconds), a local alarm would be initiated by the monitor, such as a wireless alarm. Alarm event data for an alarm caused from the line-cut monitor, or any other module system detector, will be stored in the security system central control instrument 321 EEPROM "alarm memory" and be available via coded user access from the user keypad 814. A lithium-powered clock may be added to the system to provide the user with the time of each alarm event since last arming the module security system. The lithium cell is important because the primary power supply is disconnected when the module is transported and would not be suitable to power a system clock. Higher quality security control instruments provide the alarm memory feature, such as units distributed by Aritech Corporation, (Hickory, N.C.) or Napco Security Systems, Inc., (Amityville, N.Y.) such instruments are referred to as "control panels", and offer multitudes of features and options. A preferable, custom control would provide independent zones for each detection device utilized and store event data according to the zone that caused the alarm event in conjunction with the lithium-powered clock described above. This system will inform the user, upon reviewing alarm event history, which zone caused the alarm and when. A typical LCD-type display would read as follows: "zone #1 0901am 12Dec", "zone #2 0330pm 14Dec", etc. Each zone of the control instrument refers to a specific on-board device, i.e., zone 1=photosensitive detectors, zone 2=vibration analyzer, etc. An arrangement such as this would also be an invaluable diagnostic tool that a technician may utilize to solve a system false alarm problem through positive zone, sensor, and time verification.

Also shown in this figure is internal lamp timer 189 and seat switch timer 191 along with combination exhaust vent fan and waveguide vent 606a and the intake vent fan and waveguide vent 606b.

All systems shown in FIGS. 22A through 22C may be integrated on specially fabricated long circuit boards and mounted in module case-sections utilizing specialized shock damping mounts manufactured by Sorbothane, Inc. (Kent, Ohio). A long-board format will consume ample lateral space but very little vertical space. This methodology will allow for shallow upper and lower module cabinet sections, therefore resulting in a very narrow, compact and streamlined portable communications module when closed.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A portable secure-telephone communications module, comprising:

a collapsible enclosure for holding a person desiring to perform secure remote telephone communications;

a secure remote telephone communication device in said enclosure; and means for RF shielding said enclosure to inhibit RF leakage for preventing eavesdropping from outside the enclosure.

2. The portable secure communications module of claim 1 in which said collapsible enclosure includes a collapsing frame.

3. The portable secure communications module of claim 2 in which said frame includes pantograph-type structural members.

4. The portable secure communications module of claim 2 in which said enclosure further includes rigid base and top members at the ends of said frame.

5. The portable secure communications module of claim 4 in which said frame folds into at least one of said base and top members when said enclosure is collapsed.

6. The portable secure communications module of claim 5 further including means for fastening together said base and top members when said enclosure is collapsed.

7. The portable secure communications module of claim 5 further including a telescoping handle in one or both of said base and top members extendible for transport of said module.

8. The portable secure communications module of claim 4 in which said communication device is in one or both of said base and top member when said enclosure is collapsed.

9. The portable secure communications module of claim 1 in which said enclosure includes a collapsible seat.

10. The portable secure communications module of claim 1 in which said enclosure includes a collapsible instrument cluster.

11. The portable secure communications module of claim 1 in which said enclosure includes an internal light.

12. The portable secure communications module of claim 4 further including a plurality of wheels extending from at least one of said base and top members so that said enclosure can be rolled when collapsed.

13. The portable secure communications module of claim 2 in which said collapsible enclosure further includes means for covering said frame.

14. The portable secure communications module of claim 13 in which said means for covering said frame includes a flexible cover for collapsing with said frame.

15. The portable secure communications module of claim 14 in which said means for RF shielding includes a metallic substance in said cover.

16. The portable secure communications module of claim 15 in which said means for RF shielding includes a metallized fabric, metallic screening, or metallic foil collapsible with said frame.

17. The portable secure communications module of claim 14 in which said cover is opaque to prevent visual eavesdropping and prevent devices in the enclosure from transmitting modulated non-visible light waves from the enclosure.

18. The portable secure communications module of claim 11 further including means for inhibiting sound leakage to the outside of said enclosure.

19. The portable secure communications module of claim 18 in which said means for inhibiting includes means for modulating said cover for disrupting laser interception and inhibiting noise.

20. The portable secure communications module of claim 19 in which said means for modulating includes means for directing noise at said cover.

21. The portable secure communications module of claim 1 further including means for projecting noise out from said enclosure to mask voice leakage from said enclosure.

22. The portable secure communications module of claim 21 further including means for determining when the person in said enclosure is using said communication device.

23. The portable secure communications module of claim 22 in which said means for projecting noise is responsive to said means for determining when a person is using said communication device to mask noise leakage when the person is using the communication device.

24. The portable secure communications module of claim 1 further including means for providing power to the on-board electronic systems and means for filtering said power to prevent power line signal interception.

25. The portable secure communications module of claim 1 further including means for ventilating said enclosure.

26. The portable secure communications module of claim 25 in which said means for ventilating includes RF shielded external air-conveying openings.

27. The portable secure communications module of claim 1 further including a video camera for external monitoring from said enclosure.

28. The portable secure communications module of claim 27 further including means for directing the video camera view to allow surveillance of areas outside the enclosure from within the enclosure.

29. The portable secure communications module of claim 1 further including an external signal beacon indicating when said module is in use.

30. The portable secure communications module of claim 29 further including means for enabling said beacon to provide operator control.

31. The portable secure communications module of claim 1 further including means for testing for RF leakage from said enclosure.

32. The portable secure communications module of claim 1 further including a module tamper alarm activated when said module is collapsed to deter tampering.

33. The portable secure communications module of claim 18 in which said means for inhibiting includes a sound-absorbing material covering a portion of the enclosure interior.

34. The portable secure communications module of claim 1 further including photosensitive means for detecting light on the enclosure outside to determine when an enclosure dark storage area has been compromised.

35. The portable secure communications module of claim 1 further including wireless communication means for off-site signalling of module status.

36. The portable secure communications module of claim 1 further including motion detection means communicating with the enclosure outside for detecting motion in an area outside the module.

37. The portable secure communications module of claim 15 further including metallic zipper means electrically communicating with said metallic substance for providing an RF shielded opening in said flexible cover.

38. A portable secure telephone communications module, comprising:
- a collapsible enclosure including a collapsing pantograph-type frame covered with an RF shielded flexible cover for collapsing with said frame into at least one or both rigid base and top members;
- means for ventilating said enclosure, including RF shielded ventilation ports;
- means for projecting wide-band noise from said enclosure to mask voice audio leakage from said enclosure;
- means for vibrating said flexible cover, and rigid top/bottom cabinet sections to inhibit external monitoring of said cover and cabinet sections; and
- a secure remote telephone communication device in said enclosure for providing for secure communications from said enclosure.

39. A portable secure-telephone communications module, comprising:
- a collapsible enclosure for holding a person desiring to perform secure remote telephone communications, said collapsible enclosure including a collapsing frame and a flexible cover for collapsing with said frame;
- a secure remote telephone communication device in said enclosure;
- means for RF shielding said enclosure to inhibit RF leakage for preventing eavesdropping from outside the enclosure including a metallic substance in said flexible cover; and metallic zipper means electrically communicating with said metallic substance for providing an RF shielded opening in said flexible cover.

\* \* \* \* \*